US012119940B2

(12) United States Patent
Huang et al.

(10) Patent No.: US 12,119,940 B2
(45) Date of Patent: *Oct. 15, 2024

(54) HYBRID AUTOMATIC REPEAT REQUEST PROCESSES FOR SUB-BAND FULL DUPLEX

(71) Applicant: QUALCOMM Incorporated, San Diego, CA (US)

(72) Inventors: Yi Huang, San Diego, CA (US); Muhammad Sayed Khairy Abdelghaffar, San Jose, CA (US); Hwan Joon Kwon, San Diego, CA (US); Seyedkianoush Hosseini, San Diego, CA (US); Seyed Ali Akbar Fakoorian, San Diego, CA (US); Krishna Kiran Mukkavilli, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/356,638

(22) Filed: Jul. 21, 2023

(65) Prior Publication Data

US 2023/0361935 A1    Nov. 9, 2023

Related U.S. Application Data

(63) Continuation of application No. 17/330,199, filed on May 25, 2021, now Pat. No. 11,742,994.

(Continued)

(51) Int. Cl.
*H04W 56/00* (2009.01)
*H04L 1/1812* (2023.01)
(Continued)

(52) U.S. Cl.
CPC .......... *H04L 1/1819* (2013.01); *H04L 1/1896* (2013.01); *H04L 5/1469* (2013.01); *H04W 72/0446* (2013.01); *H04W 72/23* (2023.01)

(58) Field of Classification Search
CPC ... H04L 1/1819; H04L 1/1896; H04L 5/1469; H04W 72/23; H04W 72/0446
(Continued)

(56) References Cited

U.S. PATENT DOCUMENTS

2011/0138244 A1    6/2011  Zhu et al.
2017/0367046 A1*  12/2017  Papasakellariou ..........................
                                                              H04W 72/0446
(Continued)

FOREIGN PATENT DOCUMENTS

WO    WO-2011056043 A2    5/2011

OTHER PUBLICATIONS

Huawei, et al., "Forward Compatibility on Duplexing", 3GPP Draft, 3GPP TSG RAN WG1 Meeting #86, R1-167235, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051125784, 3 Pages, p. 2.

(Continued)

*Primary Examiner* — Sai Ming Chan
(74) *Attorney, Agent, or Firm* — QUALCOMM IP DEPT.; James Hunt Yancey, Jr.

(57) ABSTRACT

A UE may identify slots to transmit and/or receive information related to one or more HARQ processes in frame structure that includes both sub-band full duplex slot types and time division duplex slot types. Based on a first slot used for control information, a UE can identify a second slot for PUSCH or PDSCH communication based on an offset between the first slot and the second determined by calculating slot offsets (e.g., based on parameters received from a base station). In some aspects, a UE may exclude certain slot duplex types (e.g., SBFD or TDD) when calculating slot offsets. In some aspects, a UE may calculate slot offsets differently for different HARQ processes corresponding to one frame. In some aspects, slot offset behaviors may be based on priority of information associated with a HARQ process.

30 Claims, 20 Drawing Sheets

Related U.S. Application Data

(60) Provisional application No. 63/031,477, filed on May 28, 2020.

(51) Int. Cl.
*H04L 1/1867* (2023.01)
*H04L 5/14* (2006.01)
*H04W 72/0446* (2023.01)
*H04W 72/23* (2023.01)

(58) Field of Classification Search
USPC .......................................................... 370/329
See application file for complete search history.

(56) References Cited

U.S. PATENT DOCUMENTS

| | | | |
|---|---|---|---|
| 2019/0110287 A1 | 4/2019 | Lee et al. | |
| 2019/0363843 A1* | 11/2019 | Gordaychik | H04L 1/08 |
| 2020/0267730 A1* | 8/2020 | Kim | H04W 72/0453 |
| 2021/0376960 A1 | 12/2021 | Huang | |

OTHER PUBLICATIONS

Huawei, et al., "General Discussion on Flexible Duplex", 3GPP Draft, 3GPP TSG RAN WG1 Meeting #87, R1-1611224, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 5, 2016 (Nov. 5, 2016), XP051189796, 5 Pages, pp. 2-4.
Huawei, et al., "Some NR FDD Design Aspects", 3GPP Draft, 3GPP TSG RAN WG1 Meeting 90bis, R1-1717098, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051340288, 3 Pages, pp. 1-2.
International Preliminary Report on Patentability—PCT/US2021/034349, The International Bureau of WIPO—Geneva, Switzerland, Dec. 8, 2022.
International Search Report and Written Opinion—PCT/US2021/034349—ISA/EPO—Sep. 10, 2021.
Huawei, et al., "Forward Compatibility on Duplexing", 3GPP TSG RAN WG1 Meeting #86, R1-167235, Gothenburg, Sweden, Aug. 22, 2016-Aug. 26, 2016, Aug. 26, 2016, 3 Pages.
China Notice of First Office Action issued in Application No. 202180032737.X, mailing date of Jun. 22, 2024 (including English-language translation provided by CN counsel).

* cited by examiner

HYBRID AUTOMATIC REPEAT REQUEST PROCESSES FOR SUB-BAND FULL DUPLEX

CROSS REFERENCE TO RELATED APPLICATIONS

This application is a continuation of U.S. patent application Ser. No. 17/330,199 entitled "Hybrid Automatic Repeat Request Processes for Sub-band Full Duplex" and filed on May 25, 2021, and claims benefit of the filing date of and priority to U.S. Provisional Patent Application 63/031,477 entitled "Hybrid Automatic Repeat Request Processes for Sub-band Full Duplex" and filed on May 28, 2020, the entirety of both of which is hereby incorporated by reference.

TECHNICAL FIELD

The technology discussed below relates generally to wireless communication systems, and more particularly, to hybrid automatic repeat requests (HARQ). Sample deployments may occur in a frame structure that includes one or more sub-band full duplex (SB-FD) slots and one or more time division duplex (TDD) slots. Some aspects may include techniques enabling and providing communication devices configured to utilize SB-FD slots and TDD slots (e.g., in some cases with respect to individual HARQ processes and/or groups of HARQ processes).

INTRODUCTION

In wireless communication, a full duplex link is one where both endpoints can simultaneously communicate with one another on the same set of resources. Many wireless communication systems provide for full duplex emulation, with simultaneous communication in both directions between respective endpoints, but with the different-direction transmissions using different sets of resources. For example, time division duplex (TDD) provides for transmissions in different directions on a given channel to be separated from one another using time division multiplexing. That is, at some times the channel is dedicated for transmissions in one direction, while at other times the channel is dedicated for transmissions in the other direction. In another example, frequency division duplex (FDD) provides for transmissions in different directions to operate at different carrier frequencies.

In a wireless communication system utilizing orthogonal frequency division multiplexing (OFDM), a duplexing scheme often called sub-band full duplex (SB-FD) may be used. SB-FD differs from conventional FDD in that in FDD, a given carrier is typically fully dedicated either for uplink or downlink communication. With SB-FD, a portion of the time-frequency resources on a given carrier are dedicated for uplink, and a portion of the time-frequency resources on that same carrier support downlink. Accordingly, an endpoint communicating utilizing SB-FD transmits and receives at the same time, but on different frequency resources of the same carrier. That is, the downlink resource is separated from the uplink resource in the frequency domain.

As the demand for mobile broadband access continues to increase, research and development continue to advance wireless communication technologies not only to meet the growing demand for mobile broadband access, but to advance and enhance the user experience with mobile communications. As mobile communication technology has evolved, uses for that technology have diversified. For instance some applications require higher bandwidths than others. Similarly, some applications require lower latency than others. Application such as video streaming may require high-bandwidth in the downlink direction but may have only modest uplink requirements. Meanwhile real-time applications such as remote control of critical equipment may require extremely low latency but only have modest bandwidth requirements.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In various aspects, the present disclosure provides HARQ techniques. For example, HARQ may be used for wireless communication procedures by which a user equipment (UE) may implement or handle HARQ in various full duplex scenarios. One specific example is using HARQ for frame structures that include sub-band full duplex (SB-FD) slots and time division duplex (TDD) slots. A UE may identify slots in which to transmit and/or receive information related to one or more HARQ processes by calculating slot offsets based on parameters received from a base station. In some aspects, a UE may exclude certain slot duplex types when calculating slot offsets. In some aspects, a UE may calculate slot offsets differently for different subsets of HARQ processes. In some aspects, a UE may calculate slot offsets for a given HARQ process based on priority of information associated with that HARQ process.

One aspect of the disclosure provides a method of wireless communication operable at a user equipment (UE). The method includes receiving, via a transceiver, in a first slot associated with a first hybrid automatic repeat request (HARQ) process, a first downlink slot offset parameter. The first HARQ process corresponds to a frame structure that includes one or more subband full duplex (SB-FD) slots and one or more time division duplex (TDD) slots. The method also includes receiving, via the transceiver, a first physical downlink shared channel (PDSCH) transmission in a second slot associated with the first HARQ process. The second slot associated with the first HARQ process that is offset from the first slot associated with the first HARQ process by a number of slots corresponding to the first downlink slot offset parameter. The method also includes transmitting, via the transceiver, in a third slot associated with the first HARQ process, first HARQ-ACK information indicating whether the UE successfully decoded the first PDSCH. The third slot associated with the first HARQ process is offset from the second slot associated with the first HARQ process by a number of slots corresponding to a first HARQ timing parameter.

In another aspect of the disclosure a wireless communication device operable as user equipment (a UE) includes a processor, memory coupled to the processor; and a transceiver coupled to the processor. The processor and the memory are configured to cause the UE to receive, via the transceiver, in a first slot associated with a first hybrid automatic repeat request (HARQ) process, a first downlink slot offset parameter. The first HARQ process corresponds to a frame structure that includes one or more subband full duplex (SB-FD) slots and one or more time division duplex (TDD) slots. The processor and the memory are also configured to cause the UE to receive, via the transceiver, a first physical downlink shared channel (PDSCH) transmission in a second slot associated with the first HARQ process. The second slot associated with the first HARQ process that is offset from the first slot associated with the first HARQ process by a number of slots corresponding to the first downlink slot offset parameter. The processor and the memory are also configured to cause the UE to transmit, via the transceiver, in a third slot associated with the first HARQ process that is offset from the second slot associated with the first HARQ process by a number of slots corresponding to a first HARQ timing parameter, first HARQ-ACK information indicating whether the UE successfully decoded the first PDSCH. The third slot associated with the first HARQ process is offset from the second slot associated with the first HARQ process by a number of slots corresponding to a first HARQ timing parameter.

Another aspect of the disclosure provides a wireless communication device operable as user equipment (a UE). The device includes means for receiving, in a first slot associated with a first hybrid automatic repeat request (HARQ) process, a first downlink slot offset parameter. The first HARQ process corresponding to a frame structure that includes one or more subband full duplex (SB-FD) slots and one or more time division duplex (TDD) slots. The device also includes means for receiving a first physical downlink shared channel (PDSCH) transmission in a second slot associated with the first HARQ process. The second slot associated with the first HARQ process is offset from the first slot associated with the first HARQ process by a number of slots corresponding to the first downlink slot offset parameter. The device also includes means for transmitting, in a third slot associated with the first HARQ process, first HARQ-ACK information indicating whether the UE successfully decoded the first PDSCH. The third slot associated with the first HARQ process that is offset from the second slot associated with the first HARQ process by a number of slots corresponding to a first HARQ timing parameter.

In another aspect of the disclosure non-transitory computer-readable medium storing computer-executable code operable by user equipment (a UE) is provided. The medium includes code for causing the UE to receive, via a transceiver, in a first slot associated with a first hybrid automatic repeat request (HARQ) process, a first downlink slot offset parameter. The first HARQ process corresponding to a frame structure that includes one or more subband full duplex (SB-FD) slots and one or more time division duplex (TDD) slots. The medium also includes code causing the UE to receive, via the transceiver, a first physical downlink shared channel (PDSCH) transmission in a second slot associated with the first HARQ process. The second slot associated with the first HARQ process is offset from the first slot associated with the first HARQ process by a number of slots corresponding to the first downlink slot offset parameter. The medium also includes code causing the UE to transmit, via the transceiver, in a third slot associated with the first HARQ process that is offset from the second slot associated with the first HARQ process by a number of slots corresponding to a first HARQ timing parameter, first HARQ-ACK information indicating whether the UE successfully decoded the first PDSCH These and other aspects enable a communication system that includes one or more UEs to adaptively use sub-band full duplex slot formats. In some scenarios, the adaptive or varied use of SB-FD slot formats can be used in concert with timed-division duplex slot formats. Such an arrangement can accommodate bandwidth and latency requirements of various applications and end use scenarios. And as discussed below in additional detail, some aspects and varied deployments enable and provide techniques for adapting to changes in requirements over short time periods (e.g., periods of a few seconds or less or involving low latency communications).

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
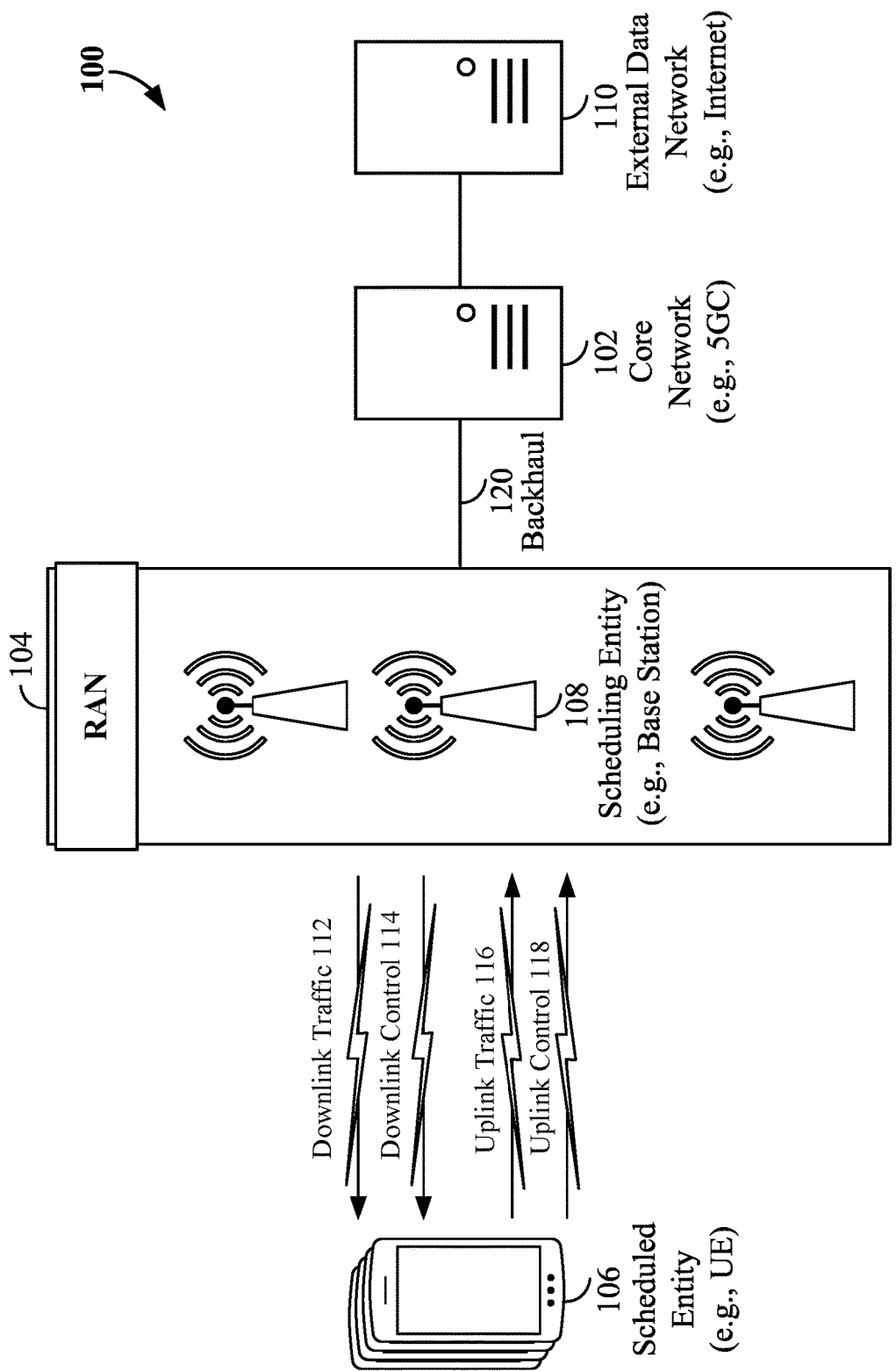
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

This disclosure provides several mechanisms and techniques for the treatment of sub-band full duplex (SB-FD) slots and time division duplex (TDD) slots in association with one or more hybrid automatic repeat request (HARQ) processes. Various examples disclosed herein enable devices and systems to interpret HARQ scheduling parameters specified by existing standards differently based on messages or other indications shared between devices. Features of these mechanisms and algorithms explained further below may provide additional flexibility in wireless communication networks where bandwidth and latency needs of different devices can differ from each other and may change over time. In some examples, a plurality of HARQ processes may be partitioned into one or more groups based on signals sent by a network or a device. In other examples, a network or device may transmit signals identifying a priority level for one or more individual HARQ processes.

It will be understood that although certain examples are discussed with respect to features or operation of a scheduled entity such as user equipment (UE) or other devices, that aspects of this disclosure relate to, and may implicitly describe, corresponding features and operation of one or more scheduling entities such as base stations and similar devices and systems. Similarly, although certain examples are discussed with respect to downlink or uplink communications, it will be understood that various examples will be applicable, respectively, to uplink or downlink communications. Further, aspects and features discussed herein may be used in open-ran deployments that may include a variety of units and components such as remote units (RUs), centralized units (CUs), distributed units (DUs). Deployments may occur also in peer-to-peer or sidelink scenarios that may or may not use controlled scheduling and instead use device ad-hoc-type communications.

Scheduling entities including base stations and scheduled entities such as UEs are special-purpose computing devices which may be provided with operating systems or specialized circuitry to perform similar functions. These devices may instantiate computing processes in memory by executing machine code or other machine-readable program code using computing resources such as allocations of memory and processing cycles and managing the use of those resources. In this context, a HARQ processes is a special-purpose computing process that may instantiated by a scheduling entity or a scheduled entity in order to generate feedback signals for error correction purposes, which may be shared with other devices to apprise them of whether a transmitted signal was received successfully or to provide estimates of fidelity of those signals as received by other devices. A device may execute multiple HARQ processes and each HARQ processes may be assigned to process specific portions of incoming communication signals. A HARQ process may thus be said to correspond to, or be associated with, particular sets of incoming signals and to particular sets of outgoing signals used to transmit output signals generated by that process.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station (BS) may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may transmit downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
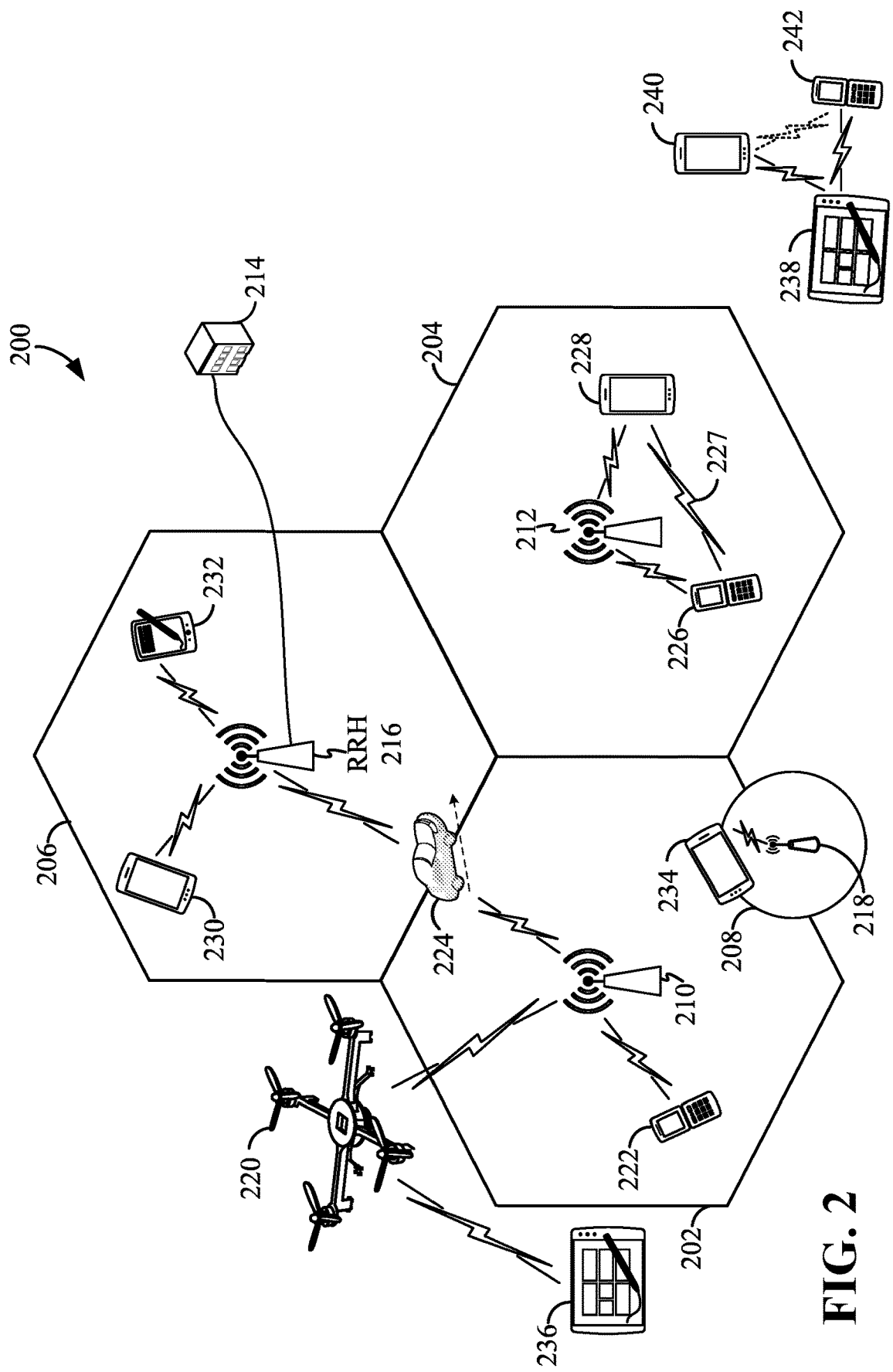
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame may generally refer to a duration of 10 ms for wireless transmissions, with each frame consisting of ten subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time—frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or as a resource block (RB) 308, which contains any suitable number of consecutive subcarriers in the frequency domain. In one example, an RB may include 12 subcarriers. In some examples, an RB may include any suitable number of consecutive OFDM symbols in the time domain.

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each subframe 302 (e.g., a 1 ms subframe) may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Figure 3:
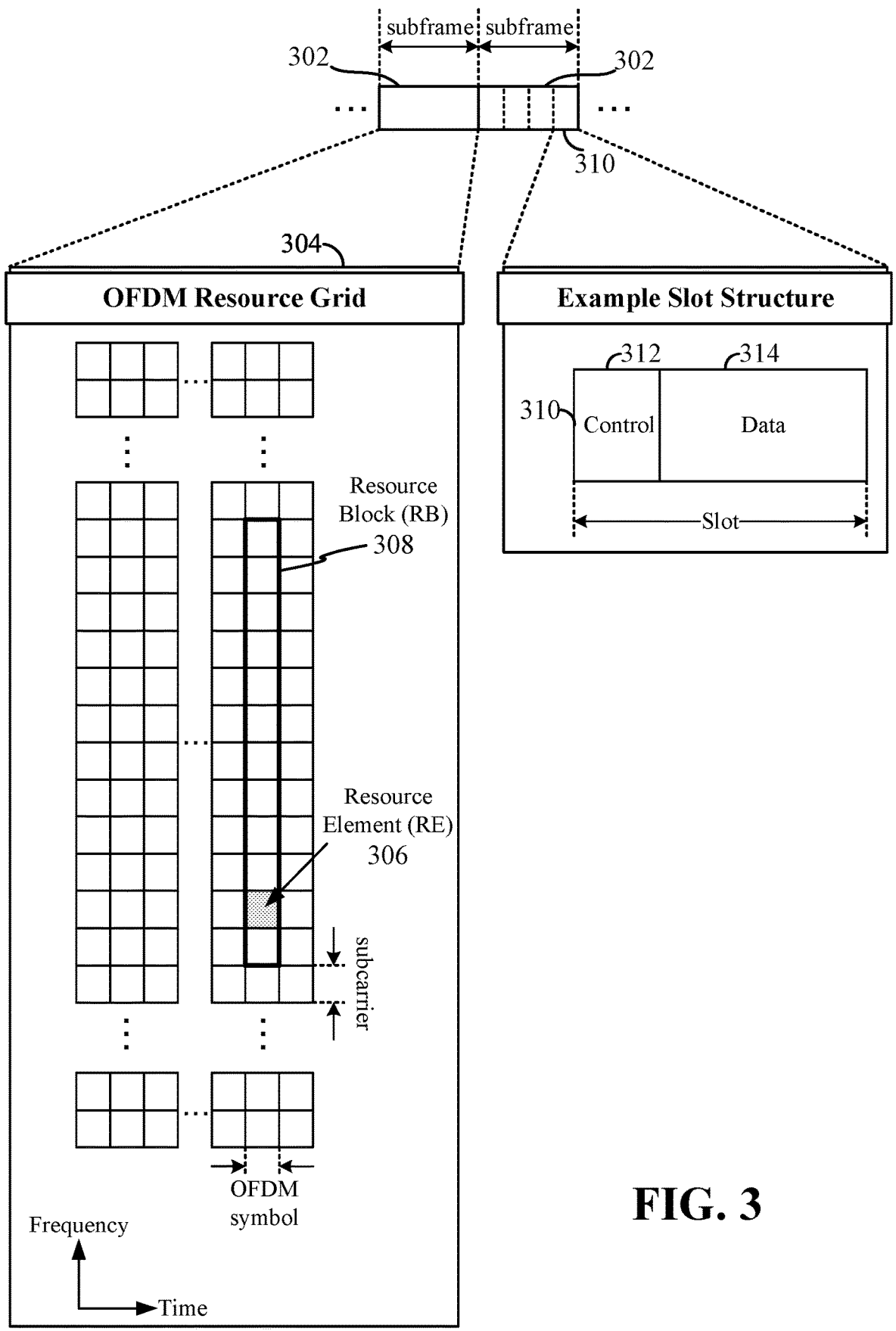
FIG. 3 is a schematic illustration of an organization of wireless resources in an air interface utilizing orthogonal frequency divisional multiplexing (OFDM) according to some aspects.

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity or base station 108) may allocate one or more REs 306 (e.g., within a control region 312) to carry DL control information 114 including one or more DL control channels that generally carry information originating from higher layers, such as a physical broadcast channel (PBCH), a physical downlink control channel (PDCCH), etc., to one or more scheduled entities or UEs 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit DCI 114 that may schedule resources for uplink packet transmissions.

UCI may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc. However, conventional HARQ techniques do not account for frame structures that include SB-FD slots in addition to slots of other slot duplex types (e.g., TDD slots such as uplink slots, downlink slots, or "special" slots). As used herein, the term "slot duplex type" is to be understood to be describing the duplex configuration of an associated slot, including, but not limited to, SB-FD and TDD slot duplex types.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The air interface in the radio access network 200 may utilize one or more duplexing algorithms. Duplex refers to a point-to-point communication link where both endpoints can communicate with one another in both directions. Full duplex means both endpoints can simultaneously communicate with one another on the same set of resources. Half duplex means only one endpoint can send information to the other at a time. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction (e.g., DL), while at other times the channel is dedicated for transmissions in the other direction (e.g., UL), where the direction may change very rapidly, e.g., several times per slot.

Figure 4:
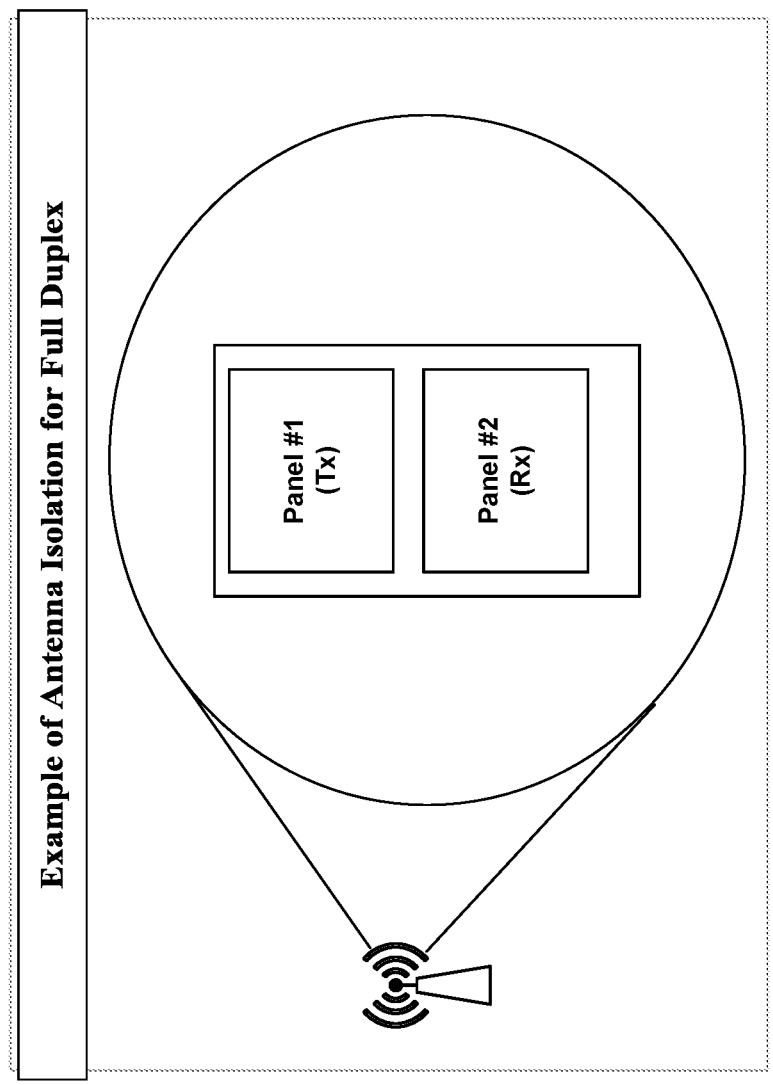
FIG. 4 is a detail view of an example of a base station with physically separated and isolated antenna panels according to some aspects.

In a wireless link, a full duplex channel generally relies on isolation of a transmitter and receiver. Suitable isolation techniques include physical separation, electromagnetic shielding, and interference cancellation technologies. In some examples, a base station may provide for improved isolation between simultaneous transmission and reception operations by utilizing two separate, physically isolated antenna panels for the UL and DL, respectively. As one illustrative example shown in FIG. 4, when communicating over a full duplex carrier, the base station may utilize panel 1 for DL transmission, while the base station may utilize panel 2 for UL reception.

Nevertheless, even with such physical isolation of transmit and receive antenna panels, a wireless communication endpoint carrying out full duplex communication still faces significant interference. And in particular, self-interference generated at that same endpoint can be substantial. That is, because the transmit and receive antennas at the base station are so close to each other, while the base station is transmitting a DL signal, it is also interfering on the nearby receive antennas. This can make it difficult for the base station to decode a received UL signal.

Figure 5:
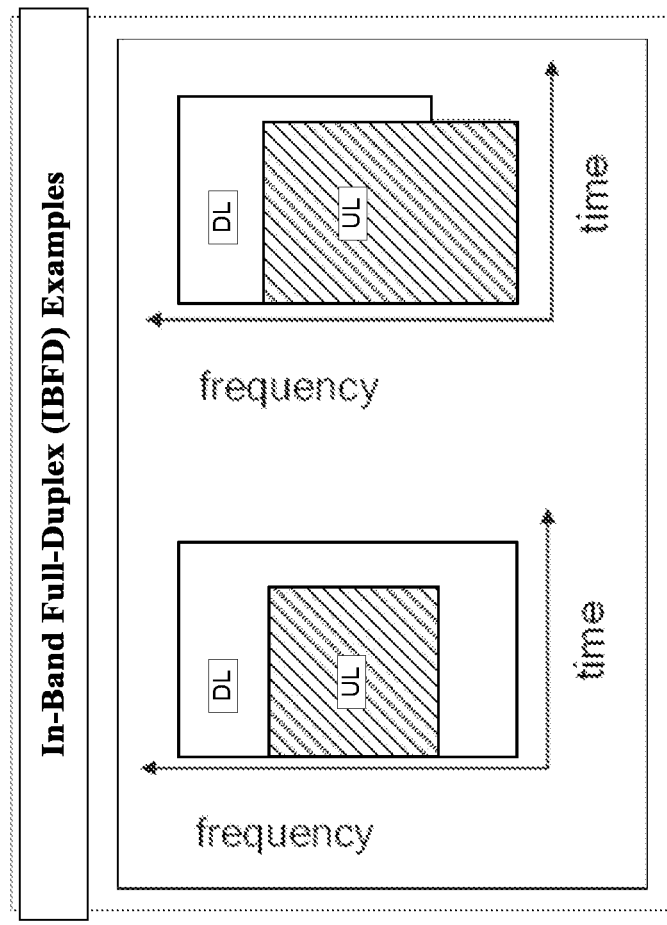
FIG. 5 is a schematic illustration of in-band full duplex (IBFD) communication according to some aspects.

One example of a full duplex communication scheme is often referred to in the art as in-band full duplex (IB-FD). Two examples are illustrated in FIG. 5. In IB-FD, generally, UL and DL communications overlap in time and frequency. In some examples, the overlap can be partial, as shown on the right where only a part of the UL overlaps with the DL. And in some examples, the overlap can be complete, as shown on the left where the entire UL overlaps with the DL.

Figure 6:
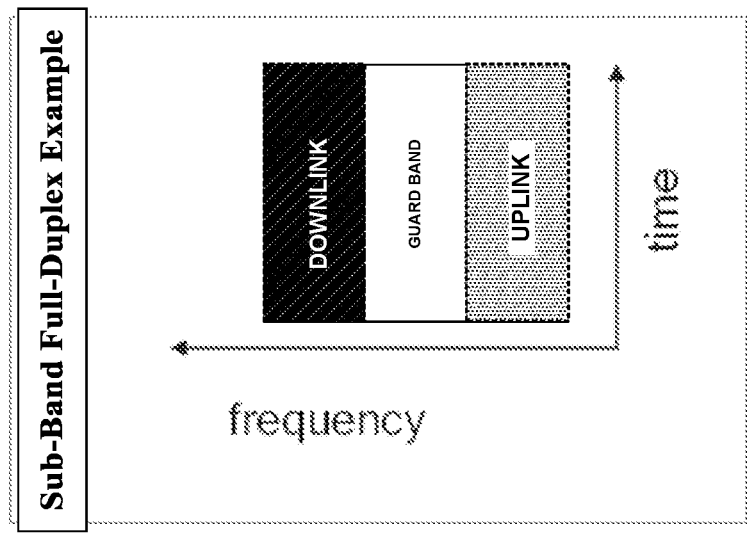
FIG. 6 is a schematic illustration of sub-band full duplex (SB-FD) communication according to some aspects.

Recently, interest has turned toward what may be referred to as sub-band full duplex (SB-FD) or flexible duplex. SB-FD differs from conventional FDD in that in FDD, a given carrier is typically fully dedicated either for UL or DL communication. With SB-FD, a portion of the time-frequency resources on a given carrier are dedicated for UL, and a portion of the time-frequency resources on that same carrier support DL. Accordingly, an endpoint communicating utilizing SB-FD transmits and receives at the same time, but on different frequency resources of the same carrier. That is, the DL resource is separated from the UL resource in the frequency domain. FIG. 6 illustrates one example of an SB-FD carrier. In the illustrated example, the DL and UL portions of the carrier are separated from one another in frequency, with a guard band (GB) between the respective UL and DL portions to reduce interference such as leakage of the UL into the DL, or leakage of the DL into the UL. However, because the GB may be relatively narrow (e.g., 5 RBs) compared to the separation between carriers in conventional FDD, wireless communication utilizing SB-FD may suffer from a greater amount of interference than conventional FDD. With respect to self-interference, a base station utilizing SB-FD may suffer from its DL transmission leaking into its UL reception; and a UE utilizing SB-FD may suffer from its UL transmission leaking into its DL reception.

Referring once again to FIG. 4, when communicating with a SB-FD carrier, a base station may utilize panel 1 for DL transmission at one portion of a SB-FD carrier, while using panel 2 for UL reception at another portion of the SB-FD carrier. Accordingly, self-interference at the base station can be reduced to some degree via physical isolation of the antennas. In various examples, the respective UL and DL portions of the SB-FD carrier may be allocated within a given slot utilizing any suitable configuration, separated by frequency, time, or both frequency and time.

Figure 7:
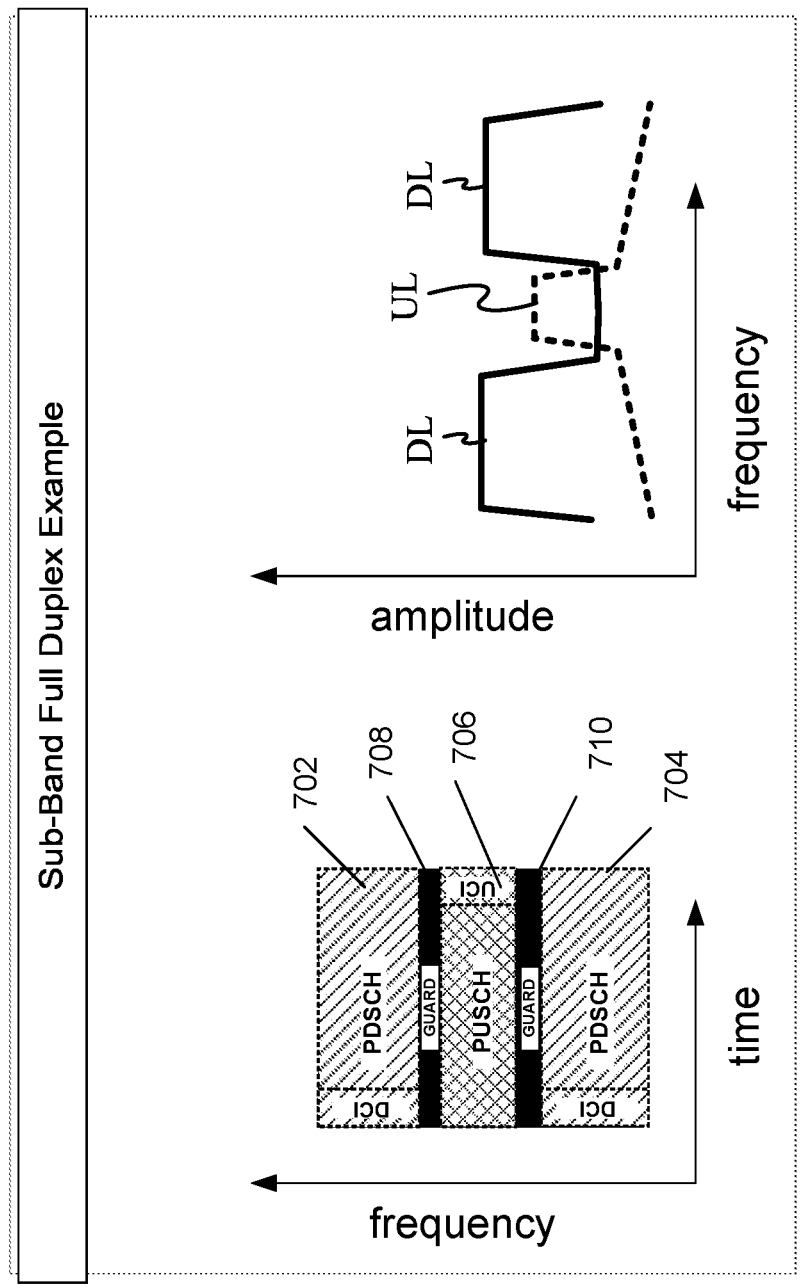
FIG. 7 is a schematic illustration of a slot configured for SB-FD according to some aspects.

FIG. 7 shows an example of a slot format for wireless communication utilizing SB-FD according to an aspect of the present disclosure. In the illustrated slot, the upper portion 702 and lower portion 704 of the carrier are utilized for DL communication, and in between those portions lies an UL portion 706 utilized for UL communication. Two GBs 708 and 710 separate the UL portion from the DL portions, located immediately above and below the UL portion in frequency.

Figure 8:
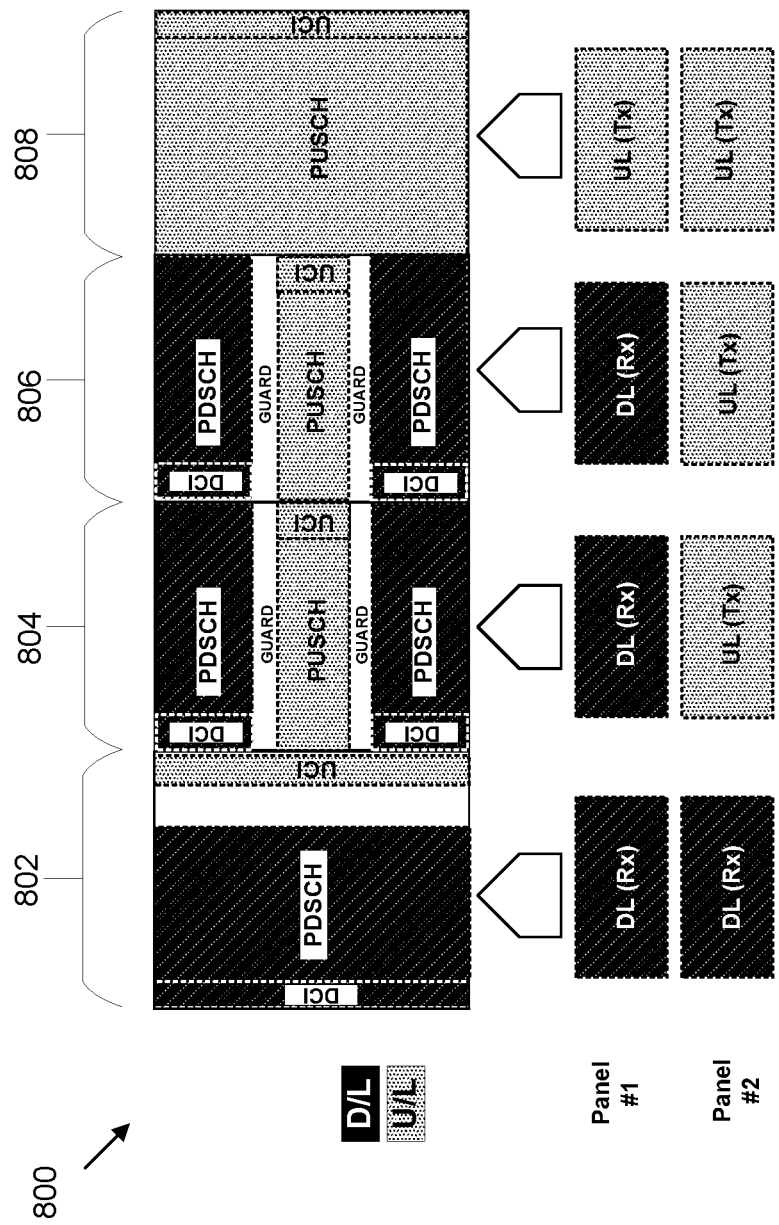
FIG. 8 is a schematic illustration of a series of slots on a flexible duplex carrier, and corresponding operation of physically separated and isolated antenna panels, according to some aspects.

FIG. 8 shows a sequence 800 of four consecutive slots 802, 804, 806, and 808 in a carrier configured to allow dynamic reconfiguration between slots for TDD and SB-FD communication. In some examples, the respective portions of the carrier within a given slot may be designated as UL portion or DL portion by the base station and signaled to a UE by utilizing a suitable indication or configuration message that enables a UE to determine a slot format. For example, a UE may determine a slot format for a given slot based on a suitable indication or configuration message provided by a base station. This indication or configuration message may be included within DCI, within higher-layer (e.g., RRC) signaling, or some combination of these. The slot format corresponds to a configuration of REs within a slot, with each RE being designated as being either for UL, DL, or, in some examples, as being flexible (can be either UL or DL). In various examples, a configuration or indication message utilized by a UE to determine a slot format may correspond to any suitable number of one or more slots, and may correspond to contemporaneous and/or later-used slot(s).

As illustrated, the first slot 802 is configured for TDD, wherein the full carrier bandwidth is utilized for DL communication, other than the final one or two OFDM symbols of the slot, where the full carrier bandwidth may be utilized for UL communication, such as a HARQ-ACK, CSF, and/or uplink user data. For example, the first slot 802 may be considered a "special" slot because it includes both uplink and downlink time domain allocations. The second slot 804 and third slot 806 are configured utilizing SB-FD in essentially the same way as described above and illustrated in FIG. 7, with DL communication at the upper and lower portions of the carrier and UL communication in between. As discussed above, the UL portion of the carrier is shown being separated from the DL portions of the carrier by suitable-bandwidth guard bands above and below the UL portion. And the fourth slot 808 is configured for TDD, as fully for UL communication.

In an example of a base station including the two antenna panels described above and illustrated in FIG. 4, the operation of the respective antenna panels during the different slots is illustrated below the respective slots in FIG. 8. That is, in the first slot 802, both antenna panels are utilized for DL communication; and in the fourth slot 808, both antenna panels are utilized for UL communication. In the second and third illustrated slots 804 and 806, which are configured for SB-FD, the top antenna panel is configured for DL transmission, while the bottom antenna panel is configured for UL reception.

5G NR specifications provide for HARQ that is asynchronous in both uplink and downlink. Thus, for HARQ between a base station and a UE, HARQ timing information must be provided to the UE by the base station. The UE may receive the HARQ timing information via the DCI of a PDCCH sent by the base station, via RRC signaling sent by the base station, or via other applicable control signaling sent by the base station. The HARQ timing information for DL may include a downlink slot offset parameter $K_0$ and a HARQ-ACK timing parameter $K_1$ (sometimes referred to as "HARQ timing parameter $K_1$"). The downlink slot offset parameter $K_0$ defines, for a corresponding DL HARQ process, a slot offset (e.g., number of slot transitions) between the slot carrying DL scheduling information in a PDCCH and the slot carrying the corresponding scheduled PDSCH. The HARQ timing parameter $K_1$ defines, for a corresponding DL HARQ process, a slot offset between the slot carrying a PDSCH and a slot carrying an ACK/NACK transmitted by the UE in response to the PDSCH. The uplink slot offset parameter $K_2$ defines, for a corresponding UL HARQ process, a slot offset between the slot carrying UL scheduling information in a PDCCH and the slot carrying the corresponding scheduled PUSCH transmitted by the UE.

In aspects of the present disclosure, a UE may determine, for one or more HARQ processes of the UE, slot duplex types that are to be ignored (i.e., excluded) when calculating slot offsets based on parameters $K_0$, $K_1$, and/or $K_2$. Such configurations of the UE may effectively disallow scheduled data and/or the HARQ-ACK from being carried in a given slot, based on the slot duplex type of that slot. In some aspects, a UE may, for all or a subset of active HARQ processes, exclude SB-FD slots from slot offset calculations. In some aspects, the UE may, for all or a subset of active HARQ processes, exclude TDD slots from slot offset calculations. In some aspects, a UE may, for all or a subset of available HARQ processes, perform slot offset calculations irrespective of slot duplex type.

Figure 9:
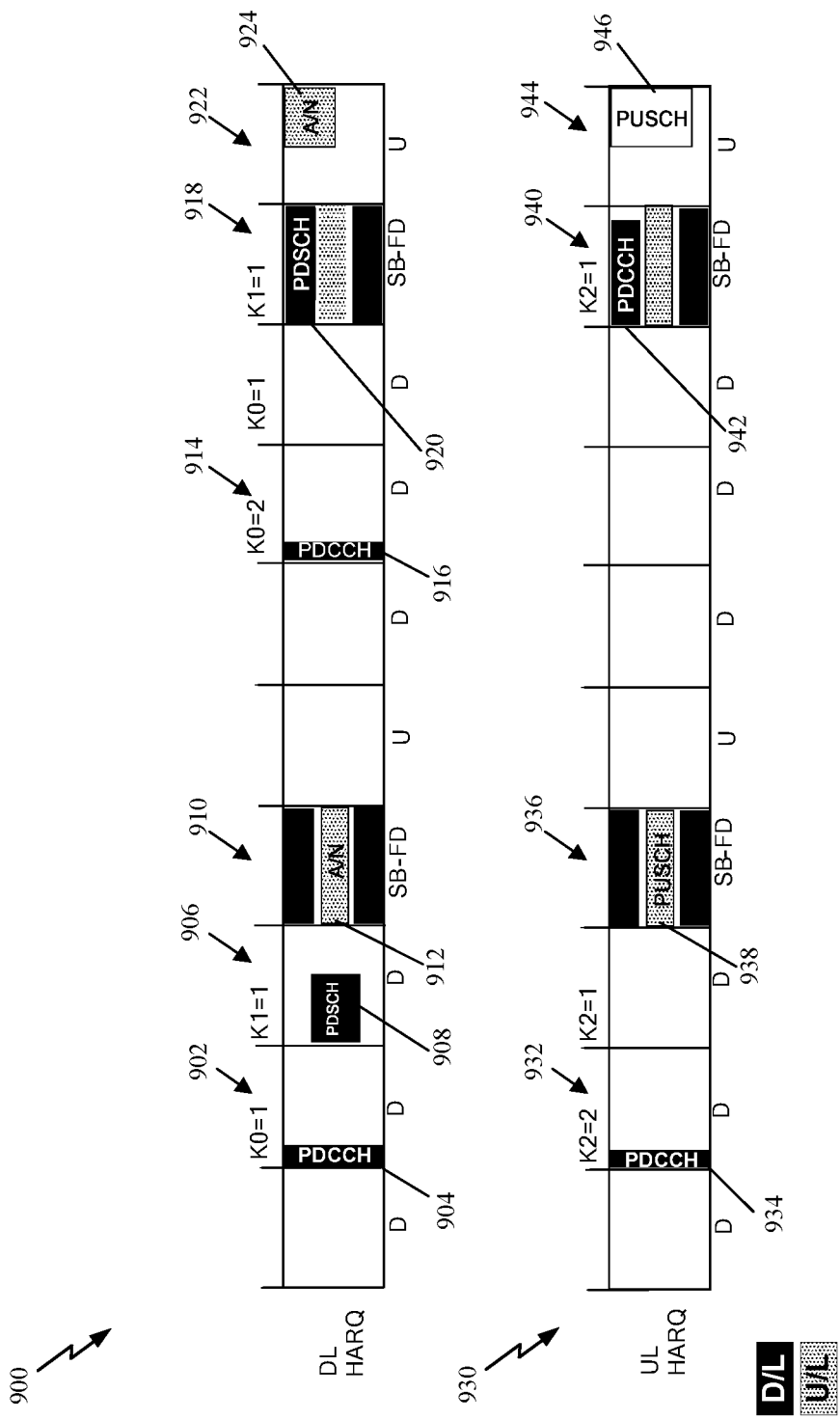
FIG. 9 is a schematic illustration of a series of slots on an uplink flexible duplex carrier and a downlink flexible duplex carrier, where a user equipment (UE) carries out a hybrid automatic repeat request (HARQ) process and its corresponding slot offset calculations with respect to both time division duplex (TDD) and SB-FD slots, according to some aspects.

FIG. 9 shows an illustrative sequence of slots 900 (e.g., a frame or a portion of a frame) corresponding to a DL HARQ process (i.e., the DL HARQ process is assigned to operate on DL transmissions over the depicted sequence of slots), and an illustrative sequence of slots 930 (e.g., a frame or a portion of a frame) corresponding to a UL HARQ process (i.e., the UL HARQ process is assigned to operate on UL transmissions over the depicted sequence of slots) according to an aspect of the present disclosure. Either of the HARQ processes may correspond to communications carried out by a UE (e.g., one of UEs 106, 234, 236, 238 of FIGS. 1 and/or 2). The frame structure of both the DL HARQ process and the UL HARQ process includes a combination of SB-FD slots and TDD slots (e.g., uplink slots designated by "U" and downlink slots designated by "D"). Herein, "TDD slots" may refer to slots having uplink, downlink, or "special" slot duplex types. In the illustrated example, each sequence of slots 900 and 930 includes a slot pattern DDD(SB-FD)U, which may repeat over the length of a frame. In each example sequence, the example slot pattern is repeated twice. The use of this particular slot pattern is intended to be illustrative, not limiting. In the illustrated example, in accordance with an aspect of the present disclosure, a UE is configured to transmit and receive information over a carrier in accordance with one or more HARQ processes, and to calculate corresponding slot offsets irrespective of slot duplex type. Thus, the UE may consider at least TDD and SB-FD slot duplex types when calculating slot offsets and may transmit and receive data corresponding to the DL HARQ process and the UL HARQ process in both TDD slots and SB-FD slots, irrespective of the slot duplex type of the PDCCH, PDSCH, or PUSCH on which the slot offset calculation is based.

Referring first to the sequence of slots 900 corresponding to the DL HARQ process (i.e., the DL HARQ process is assigned to operate on DL transmissions over the depicted sequence of slots), the UE may receive control signaling. The control signal may be received via a control channel (e.g., a PDCCH 904) from a base station in DL slot 902 including scheduling information for a corresponding PDSCH (e.g., PDSCH 908), and an indication of whether scheduled TB(s) in the PDSCH will carry an initial transmission or a HARQ retransmission. Here, DL slot 902 is configured for TDD. The PDCCH 904 may further include DCI that defines a slot offset parameter $K_0=1$ and a HARQ timing parameter $K_1=1$. Alternatively, another control signal (e.g., a prior PDCCH or RCC signaling) provided to the UE by the base station at a time preceding the DL slot 902 could define the parameters $K_0$ and $K_1$ for the DL HARQ process.

The UE may calculate a slot offset from the DL slot 902. The DL slot 902 is the slot that carried the corresponding PDCCH. The calculation can be based on the slot offset parameter $K_0$ to determine that the base station will transmit a PDSCH 908 to the UE at DL slot 906. As illustrated, the DL slot 906 is also configured for TDD. Here, the slot offset between the DL slot 902 and the DL slot 906 is one slot, because the slot offset parameter $K_0=1$. According to an aspect of this disclosure, the UE may calculate this slot offset between the DL slot 902 and the DL slot 906 irrespective of the slot duplex type of the DL slot 902, the DL slot 906, and any other slots between them, if such slots exist.

Upon receiving the PDSCH 908 at the DL slot 906, the UE may calculate one or more CRCs for one or more TBs included in the PDSCH 908. The UE may then compare corresponding CRC bits received in the PDSCH 908 to the calculated CRC bits to determine whether to transmit an ACK or a NACK 912 (sometimes referred to as "ACK/NACK" or "A/N") for the received TB(s). For example, the UE may transmit an ACK to the base station responsive to determining that the received CRC bits match the calculated CRC bits. The ACK may indicate that the UE successfully received and correctly decoded the PDSCH 908. Alternatively, the UE may transmit a NACK to the base station responsive to determine that the received CRC bits do not match the calculated CRC bits. The NACK may indicate that the UE did not successfully receive and decode the PDSCH 908. The base station may treat the NACK as a request for a HARQ retransmission of the information included in the PDSCH 908.

The UE may identify a slot offset from the DL slot 906 (e.g., the slot carrying the scheduled PDSCH) based on the HARQ timing parameter $K_1$ to determine the slot in which to transmit the corresponding ACK/NACK 912 (i.e., the ACK/NACK designated as indicated the ACK/NACK status of the PDSCH scheduled for the DL slot 906). Because the HARQ timing parameter indicates an offset of one slot (i.e., $K_1=1$) in the illustrated example, the UE transmits the ACK/NACK 912 in a SB-FD slot 910. As illustrated, the SB-FD slot 910 is configured for SB-FD. Once again, in this example the UE may calculate this slot offset between the DL slot 906 and the SB-FD slot 910 irrespective of the slot duplex type of DL slot 906, SB-FD slot 910, and any other slots between them, if such slots exist. The UE may then wait until it receives another PDCCH 916 corresponding to the DL HARQ process, e.g., in DL slot 914.

In the illustrated example, after receiving the ACK/NACK 912 in the SB-FD slot 910, the base station may transmit DCI. The DCI is carried in PDCCH 916 which is transmitted in DL slot 914. The DCI in the PDCCH 916 may update the value of the slot offset parameter to two slots (i.e., $K_0=2$), while the HARQ timing parameter remains equal to one (i.e., $K_1=1$). Further, in the PDCCH 916 carried in the DL slot 914, the base station may transmit scheduling information for a corresponding PDSCH (e.g., PDSCH 920) and an indication whether scheduled TB(s) in the PDSCH will carry an initial transmission or a HARQ retransmission. The UE may calculate a slot offset from the DL slot 914 (e.g., the slot carrying the corresponding PDCCH 916) based on the slot offset parameter indicating two slots (i.e., $K_0=2$), to determine that the base station will transmit the corresponding scheduled PDSCH 920, two slots later, in a SB-FD slot 918. As illustrated, the SB-FD slot 918 is configured for SB-FD. Again, in this example the UE may calculate this slot offset between the DL slot 914 and the SB-FD slot 918 irrespective of the slot duplex type of DL slot 914, SB-FD slot 918, and any other slots between them, if such slots exist.

The UE may determine whether to transmit an ACK or NACK based on the CRC bits and TB(s) in the PDSCH 920, as described above. The UE may calculate a slot offset from the SB-FD slot 918 (e.g., the slot that carried the corresponding PDSCH 920) based on the HARQ timing parameter $K_1$ for the DL HARQ process. The UE may transmit the ACK/NACK 924 one slot later (i.e., $K_1=1$), in a UL slot 922. As illustrated, the UL slot 922 is also configured for TDD.

Referring now to the sequence of slots 930 corresponding to the UL HARQ process (i.e., the UL HARQ process is assigned to operate on UL transmissions over the depicted sequence of slots), the UE may receive a PDCCH 934 from a base station. In some scenarios, the PDCCH 934 may be in DL slot 932. The PDCCH 934 can include scheduling information for a corresponding PUSCH (e.g., PUSCH 938). The PDCCH 934 may also include an indication of whether scheduled TB(s) in the PUSCH will carry an initial transmission or a HARQ retransmission. Here, the DL slot 932 is configured for TDD. The PDCCH 934 may further include DCI that defines a slot offset parameter $K_2=2$. Alternatively, another control signal (e.g., a prior PDCCH or RCC signaling) provided to the UE by the base station at a time preceding the DL slot 932 could define the parameter $K_2$ for the UL HARQ process.

The UE may calculate a slot offset from the DL slot 932 based on the slot offset parameter $K_2$ to determine that the UE is scheduled to transmit a PUSCH. In this example, the UE determines that the PUSCH 938 is scheduled to use the SB-FD slot 936. Here, the slot offset between the DL slot 932 and the SB-FD slot 936 is two slots (because the slot offset parameter $K_2=2$). As illustrated, the slot 936 is configured for SB-FD. According to an aspect of this disclosure, the UE may calculate this slot offset between the DL slot 932 and the SB-FD slot 936 irrespective of the slot duplex type of the DL slot 932, the SB-FD slot 936, and any other slots between them, if such slots exist.

The UE may then transmit the PUSCH 938 to the base station in the SB-FD slot 936. The UE may then wait to receive another PDCCH 942 corresponding to the UL HARQ process from the base station, e.g., in DL slot 940.

In the illustrated example, after receiving the PUSCH 938 in SB-FD slot 936, the base station may transmit DCI. In this example, the DCI is transmitted in the PDCCH 942. The PDCCH 942 is carried in a SB-FD slot 940 and is used to update the value of the slot offset parameter $K_2$ ($K_2=1$). Further, in the PDCCH 942, the base station may transmit scheduling information for a corresponding PUSCH (e.g., PUSCH 946) and an indication of whether the scheduled TB(s) in the PUSCH will carry an initial transmission or a HARQ retransmission. As illustrated, the SB-FD slot 940 is also configured for SB-FD.

The UE may then calculate a slot offset from the SB-FD slot 940 based on the slot offset parameter $K_2$ for the UL HARQ process. The UE may then transmit an initial transmission or a HARQ retransmission (e.g., per the indication included in the PDCCH 942) in a PUSCH 946 $K_2=1$ slot later, in a UL slot 944. As illustrated, the UL slot 944 is also configured for TDD.

Figure 10:
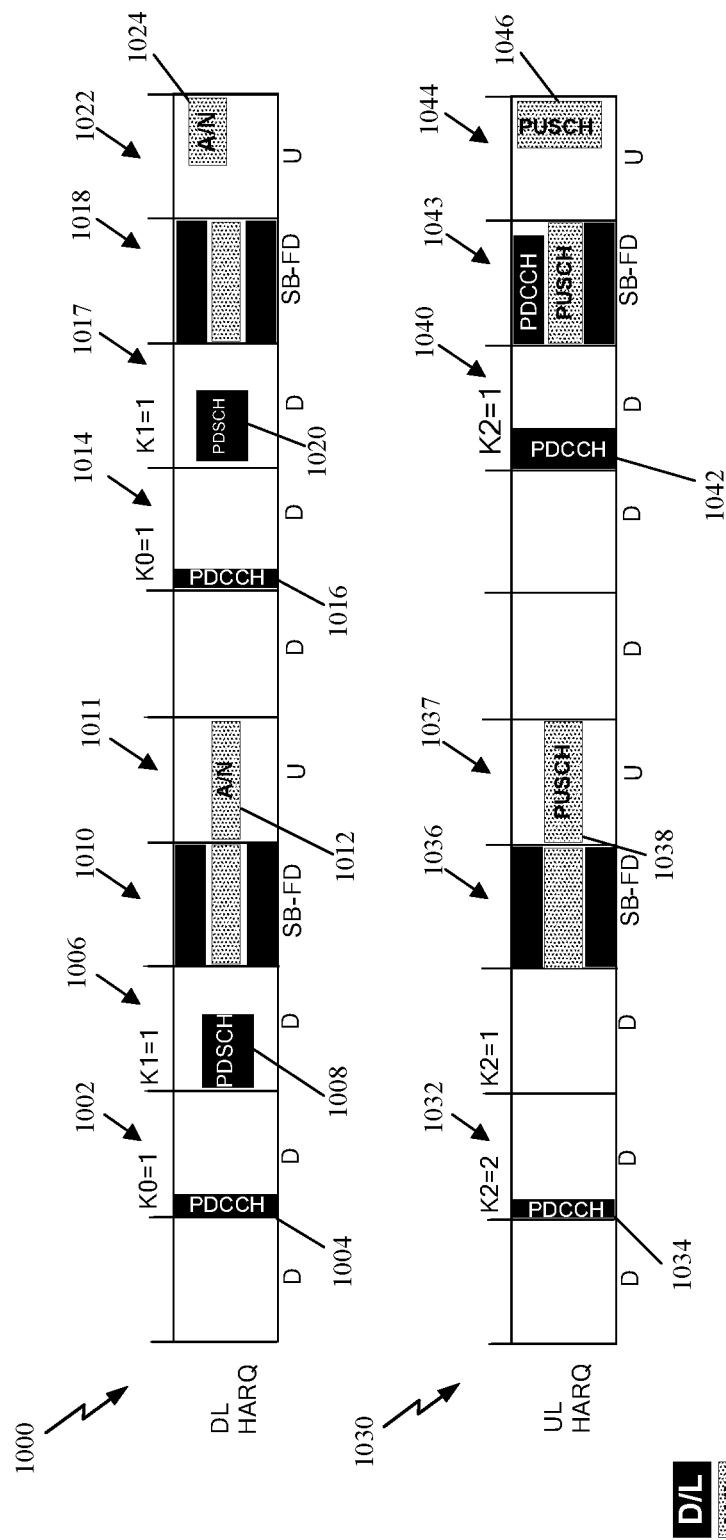
FIG. 10 is a schematic illustration of a series of slots on an uplink flexible duplex carrier and a downlink flexible duplex carrier, where a UE carries out a HARQ process and its corresponding slot offset calculations with respect to only TDD slots, according to some aspects.

FIG. 10 shows an illustrative sequence of slots 1000 (e.g., a frame or a portion of a frame) corresponding to a DL HARQ process and an illustrative sequence of slots 1030 (e.g., a frame or a portion of a frame) corresponding to a UL HARQ process in accordance with another aspect of this disclosure. Either of the HARQ processes may correspond to communications carried out by a UE (e.g., one of UEs 106, 234, 236, 238 of FIGS. 1 and/or 2). The frame structure of both the DL HARQ process and the UL HARQ process includes a combination of SB-FD slots and TDD slots (e.g., uplink slots designated by "U" and downlink slots designated by "D"). In the illustrated example, each sequence of slots 1000 and 1030 includes an illustrative slot pattern DDD(SB-FD)U, which may repeat over the length of a frame. In the illustrated example, in accordance with an aspect of the present disclosure, a UE is configured to transmit and receive information over a carrier in accordance with one or more HARQ processes, and to calculate corresponding slot offsets exclusive of SB-FD slots (e.g., only with respect to TDD slots). Thus, the UE may ignore or skip over slots of the SB-FD slot duplex type when calculating slot offsets based on parameters $K_0$, $K_1$, and $K_2$. Following receipt of a PDCCH corresponding to a given HARQ process, the UE may transmit and receive information (e.g., via, PDSCH, PUSCH, and/or ACK/NACK) corresponding to that HARQ process only in slots of the TDD slot duplex type (e.g., including UL, DL, and special slot duplex types).

Referring first to the sequence of slots 1000 corresponding to the DL HARQ process, the UE may receive a PDCCH 1004 from a base station in DL slot 1002, including scheduling information for a corresponding PDSCH (e.g., PDSCH 1008), and an indication of whether TB(s) in the PDSCH will carry an initial transmission or a HARQ retransmission. Here, the DL slot 1002 is configured for TDD. The PDCCH 1004 may further include DCI that defines a slot offset parameter $K_0=1$ and a HARQ timing parameter $K_1=1$. Alternatively, another control signal (e.g., a prior PDCCH or RCC signaling) provided to the UE by the base station at time preceding the DL slot 1002 could define the parameters $K_0$ and $K_1$ for the DL HARQ process.

The UE may calculate a slot offset from the DL slot 1002 (e.g., the slot that carried the corresponding PDCCH). The UE's calculation may be based on the slot offset parameter $K_0$ to determine that the base station will transmit a PDSCH 1008 to the UE at DL slot 1006. As illustrated, the DL slot 1006 is also configured for TDD. Here, the slot offset between the DL slot 1002 and the DL slot 1006 is one slot because the slot offset parameter $K_0=1$. According to an aspect of this disclosure, the UE may exclude any slots of a SB-FD slot duplex type, if such slots exist, when calculating this slot offset between the DL slot 902 and the DL slot 906.

Upon receiving the PDSCH 1008 at the DL slot 1006, the UE determines whether to transmit an ACK or NACK to the base station based on the content of the PDSCH 1008 and a corresponding CRC comparison, as described above. The UE may identify a slot offset from the DL slot 1006 (e.g., the slot carrying the scheduled PDSCH 1008) based on the HARQ timing parameter $K_1$ to determine the slot in which to transmit a corresponding ACK/NACK 1012. As the HARQ timing parameter $K_1$ is one slot in the illustrated example and the UE is configured to exclude the SB-FD slot 1010, the UE transmits the ACK/NACK 1012 in a UL slot 1011. As illustrated, the UL slot 1011 is configured for TDD. Once again, in this example the UE may calculate this slot offset between the DL slot 1006 and the UL slot 1011 excluding slots of the SB-FD slot duplex type, if such slots exist. Here, the slot offset between the DL slot 1006 and UL slot 1011 is nominally one slot because the HARQ timing parameter $K_1=1$, but is effectively two slots because the UE excludes the SB-FD slot 1010 from the slot offset calculation. The UE may then wait until it receives another PDCCH 1016 corresponding to the DL HARQ process, e.g., in DL slot 1014.

In the illustrated example, after receiving the ACK/NACK 1012 in the UL slot 1011, the base station may transmit DCI in PDCCH 1016, carried in the DL slot 1014. While the DCI in the PDCCH 1016 may include updated values for the parameters $K_0$ and $K_1$ in some aspects of this disclosure, the DCI does not include such updates the illustrated example. In the PDCCH 1016 carried in the DL slot 1014, the base station may transmit scheduling information for a corresponding PDSCH (e.g., PDSCH 1020) and an indication whether scheduled TB(s) in the PDSCH will carry an initial transmission or a HARQ retransmission. The UE may calculate a slot offset from the DL slot 1014 (e.g., the slot carrying the corresponding PDCCH 1016) based on the slot offset parameter $K_0=1$, to determine that the base station will transmit the corresponding scheduled PDSCH 1020, one slot later, in a DL slot 1017. As illustrated, the DL slot 1017 is configured for TDD. Again, in this example the UE may calculate this slot offset between the DL slot 1014 and the DL slot 1017 excluding slots of the SB-FD slot duplex type, if such slots exist.

The UE may determine whether to transmit an ACK or NACK based on the CRC bits and TB(s) in the PDSCH 1020, as described above. The UE may calculate a slot offset from the DL slot 1018 based on the HARQ timing parameter $K_1$ for the DL HARQ process, excluding the SB-FD slot 1021. The UE may transmit the ACK/NACK 1024 slot later ($K_1=1$), in a UL slot 1022. As illustrated, the UL slot 1022 is also configured for TDD. Again, in this example the UE may calculate this slot offset between the DL slot 1018 and the UL slot 1022 excluding slots of the SB-FD slot duplex type, if such slots exist.

Referring now to the sequence of slots 1030 corresponding to the UL HARQ process, the UE may receive a PDCCH 1034 from a base station in DL slot 1032 including scheduling information for a corresponding PUSCH (e.g., PUSCH 1038), and an indication of whether scheduled TB(s) in the PUSCH will carry an initial transmission or a HARQ retransmission. Here, the DL slot 1032 is configured for TDD. The PDCCH 1034 may further include DCI that defines a slot offset parameter $K_2=2$. Alternatively, another control signal (e.g., a prior PDCCH or RCC signaling) provided to the UE by the base station at a time preceding the DL slot 1032 could define the parameter $K_2$ for the UL HARQ process.

The UE may calculate a slot offset from the DL slot 1032 based on the slot offset parameter $K_2$, while excluding the SB-FD slot 1036, to determine that the UE is scheduled to transmit a PUSCH 1038 at UL slot 1037. Here, the slot offset between the DL slot 1032 and the UL slot 1037 is nominally two slots because the slot offset parameter $K_2=2$, but is effectively three slots because the UE excludes the SB-FD slot 1036 from the slot offset calculation. As illustrated, the UL slot 1037 is configured for TDD. According to an aspect of this disclosure, the UE may exclude slots of the SB-FD slot duplex type, if such slots exist, when calculating this slot offset between the DL slot 1032 and the UL slot 1036.

The UE may then transmit the PUSCH 1038 to the base station in the UL slot 1037. The UE may then wait to receive another PDCCH 1042 from the base station, e.g., in DL slot 1040.

In the illustrated example, after receiving the PUSCH 1038 in the UL slot 1037, the base station may transmit DCI in the PDCCH 1042, carried in a DL slot 1040, to update the value of the slot offset parameter $K_2$ ($K_2=1$). Further, in the PDCCH 1042 carried in the DL slot 1040, the base station may transmit scheduling information for a corresponding PUSCH (e.g., PUSCH 1046) and an indication of whether the scheduled TB(s) in the PUSCH will carry an initial transmission or a HARQ retransmission. As illustrated, the DL slot 1040 is also configured for TDD.

The UE may determine a slot offset from the DL slot 1040 based on the slot offset parameter $K_2$ for the UL HARQ process, excluding the SB-FD slot 1043. As illustrated, the SB-FD slot 1043 is also configured for SB-FD. The UE may then transmit an initial transmission or a HARQ retransmission (e.g., per the indication included in the PDCCH 1042) in a PUSCH 1046 determined by $K_2=1$ (one slot later), in a UL slot 1044. Here, the slot offset between the DL slot 1040 and the UL slot 1044 is nominally one slot because the slot offset parameter $K_2=1$, but is effectively two slots because the UE excludes the SB-FD slot 1043 from the slot offset calculation. As illustrated, the UL slot 1044 is also configured for TDD. Again, in this example the UE may calculate this slot offset between the DL slot 1040 and the UL slot 1044 excluding slots of the SB-FD slot duplex type, if such slots exist.

Figure 11:
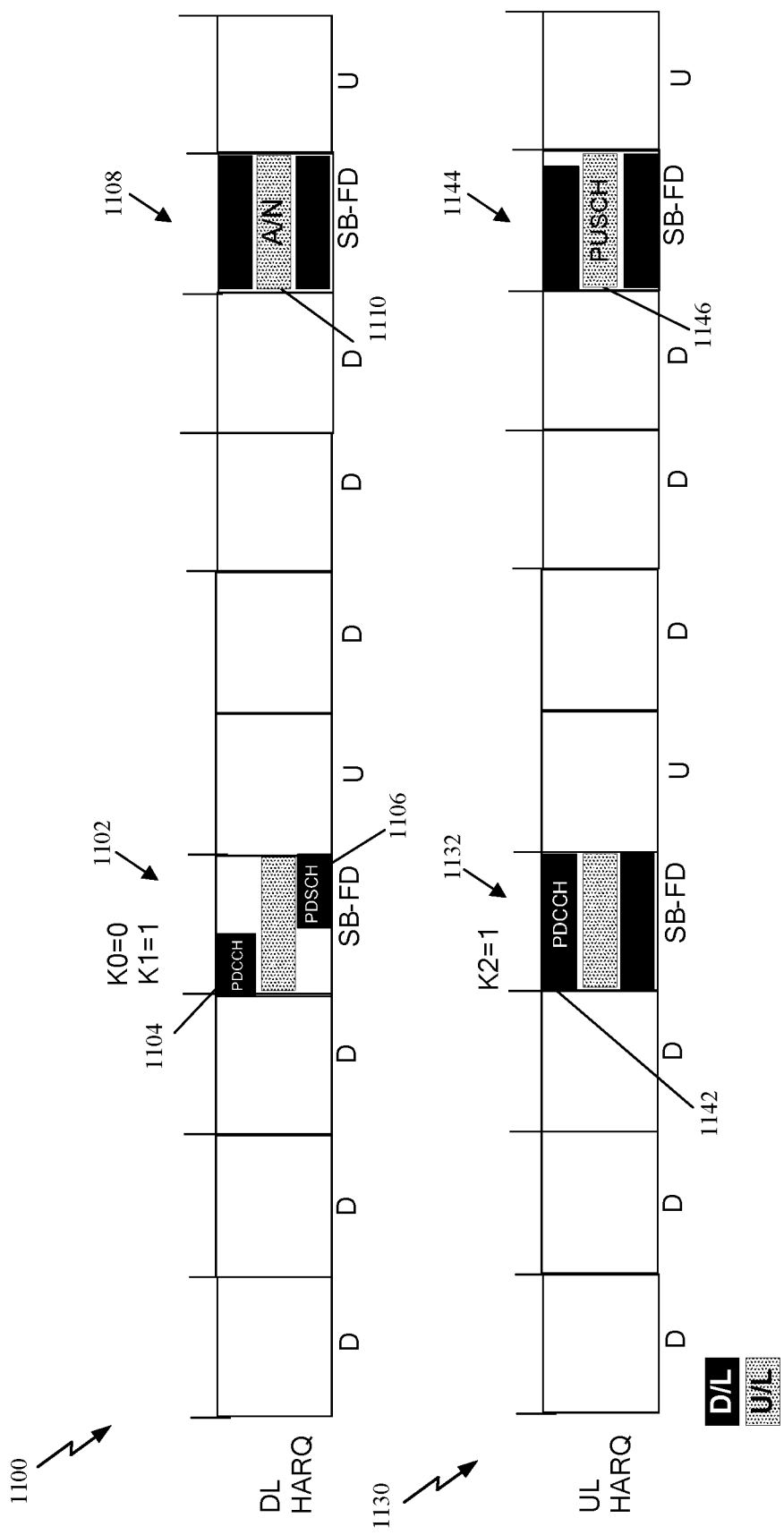
FIG. 11 is a schematic illustration of a series of slots on an uplink flexible duplex carrier and a downlink flexible duplex carrier, where a UE carries out a HARQ process and its corresponding slot offset calculations with respect to only SB-FD slots, according to some aspects.

FIG. 11 shows an illustrative sequence of slots 1100 (e.g., a frame or a portion of a frame) corresponding to a DL HARQ process and an illustrative sequence of slots 1130 (e.g., a frame or a portion of a frame) corresponding to a UL HARQ process, in accordance with another aspect of this disclosure. Either of the HARQ processes may correspond to communications carried out by a UE (e.g., one of UEs 106, 234, 236, 238 of FIGS. 1 and/or 2). The frame structure of both the DL HARQ process and the UL HARQ process includes a combination of SB-FD slots and TDD slots (e.g., uplink slots designated by "U" and downlink slots designated by "D"). In the illustrated example, each sequence of slots 1100 and 1130 includes an illustrative slot pattern DDD(SB-FD)U, which may repeat over the length of a frame. In the illustrated example, in accordance with an aspect of the present disclosure, a UE is configured to transmit and receive information over a carrier in accordance with one or more HARQ processes, and to calculate corresponding slot offsets exclusive of TDD slots (e.g., only with respect to SB-FD slots). Thus, the UE may ignore or skip over slots of the TDD slot duplex type (e.g., including UL, DL, and special slot duplex types) when calculating slot offsets based on parameters $K_0$, $K_1$, and $K_2$. Following receipt of a PDCCH corresponding to a given HARQ process, the UE may transmit and receive information (e.g., via PDSCH, PUSCH, and/or ACK/NACK) corresponding to that HARQ process only in slots of the SB-FD slot duplex type.

Referring first to the sequence of slots 1100 corresponding to the DL HARQ process, the UE may receive a PDCCH 1104 from a base station in SB-FD slot 1102, including scheduling information for a corresponding PDSCH (e.g., PDSCH 1106), and an indication of whether TB(s) in the PDSCH will carry an initial transmission or a HARQ retransmission. Here, the SB-FD slot 1102 is configured for SB-FD. The PDCCH 1104 may further include DCI that defines a slot offset parameter $K_0=0$ and a HARQ timing parameter $K_1=1$. Alternatively, another control signal (e.g., a prior PDCCH or RCC signaling) provided to the UE by the base station at a time preceding the SB-FD slot 1102 could define the parameters $K_0$ and $K_1$ for the DL HARQ process.

The UE may calculate a slot offset from the SB-FD slot 1102 (e.g., the slot that carried the corresponding PDCCH) based on the slot offset parameter $K_0$ to determine that the base station will transmit a PDSCH 1106 to the UE in the same SB-FD slot 1102. In the illustrated example, the slot offset is zero because the slot offset parameter $K_0=0$, resulting in the UE receiving the PDCCH 1104 and the PDSCH 1106 in the same SB-FD slot 1102. According to an aspect of this disclosure, the UE may exclude any slots of a TDD slot duplex type, if such slots exist, when calculating this slot offset.

Upon receiving the PDSCH 1106 at the SB-FD slot 1102, the UE determines whether to transmit an ACK or NACK based on the content of the PDSCH 1106 and a corresponding CRC bit comparison, as described above. The UE may identify a slot offset from the SB-FD slot 1102 (e.g., the slot carrying the scheduled PDSCH) based on the HARQ timing parameter $K_1$ to determine the slot in which to transmit a corresponding ACK/NACK 1110. As the HARQ timing parameter $K_1=1$ (i.e., one slot) in the illustrated example and the UE is configured to exclude TDD slots, the UE transmits the ACK/NACK 1110 in a SB-FD slot 1108. As illustrated, the SB-FD slot 1108 is configured for SB-FD. Once again, in this example the UE may calculate this slot offset between the SB-FD slot 1102 and the SB-FD slot 1108 excluding slots of the TDD slot duplex type, if such slots exist. Here, the slot offset between the SB-FD slot 1102 and the SB-FD slot 1108 is nominally one slot because the HARQ timing parameter $K_1=1$, but is effectively five slots because the UE excludes TDD slots from the slot offset calculation. The UE may then wait until it receives another PDCCH from the base station.

Referring now to the sequence of slots 1130 corresponding to the UL HARQ process, the UE may receive a PDCCH 1134 from a base station in SB-FD slot 1132 including scheduling information for a corresponding PUSCH (e.g., PUSCH 1138), and an indication of whether scheduled TB(s) in the PDSCH will carry an initial transmission or a HARQ retransmission. Here, the SB-FD slot 1132 is configured for SB-FD. The PDCCH 1134 may further include DCI that defines a slot offset parameter $K_2=1$. Alternatively, another control signal (e.g., a prior PDCCH or RCC signaling) provided to the UE by the base station at a time preceding the SB-FD slot 1132 could define the parameter $K_2$ for the UL HARQ process.

The UE may calculate a slot offset from the SB-FD slot 1132 based on the slot offset parameter $K_2$, while excluding TDD slots, to determine that the UE is scheduled to transmit a PUSCH 1138 at SB-FD slot 1136. Here, the slot offset between the SB-FD slot 1132 and the SB-FD slot 1136 is nominally one slot because the slot offset parameter $K_2=1$, but is effectively five slots because the UE excludes the intervening TDD slots from the slot offset calculation. As illustrated, the SB-FD slot 1136 is configured for TDD. According to an aspect of this disclosure, the UE may exclude slots of the TDD slot duplex type, if such slots exist, when calculating this slot offset between the SB-FD slot 1132 and the SB-FD slot 1136. The UE may then transmit the PUSCH 1138 to the base station in the SB-FD slot 1136. The UE may then wait to receive another PDCCH from the base station.

Figure 12:
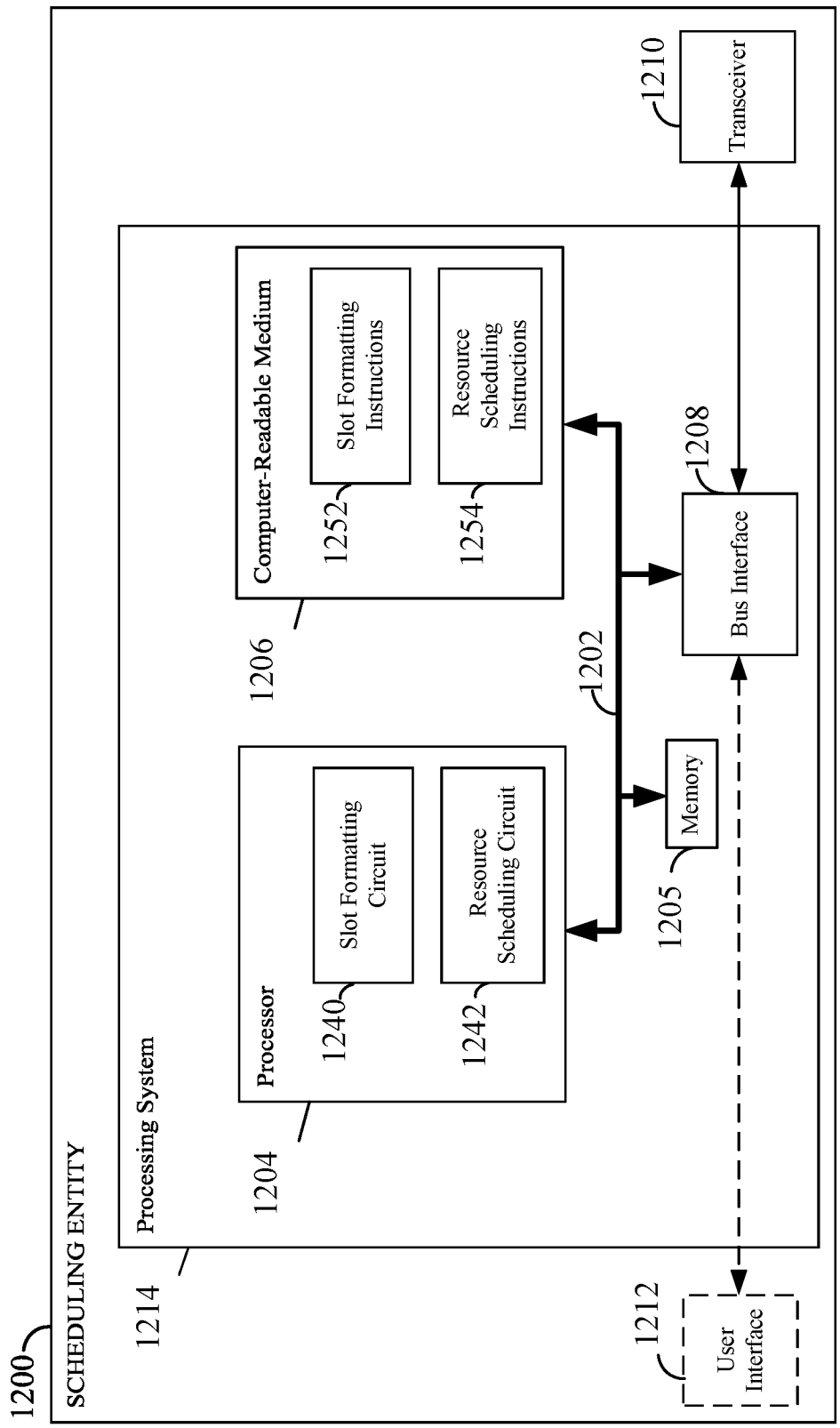
FIG. 12 is a block diagram conceptually illustrating an example of a hardware implementation for a scheduling entity according to some aspects.

FIG. 12 is a block diagram illustrating an example of a hardware implementation for a scheduling entity 1200 employing a processing system 1214. For example, the scheduling entity 1200 may be a base station as illustrated in any one or more of FIGS. 1, 2, and/or 4. In another example, the scheduling entity 1200 may be a UE as illustrated in any one or more of FIGS. 1 and/or 2.

The scheduling entity 1200 may include a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1200 may be configured to perform any one or more of the functions described herein. That is, the processor 1204, as utilized in a scheduling entity 1200, may be used to implement any one or more of the processes and procedures described below.

In this example, the processing system 1214 may include a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1008 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 may include slot formatting circuitry 1240 configured (e.g., in connection with slot formatting instructions 1252) for various functions, including, for example, determining and communicating to one or more UEs a slot format, including respective portions of a slot for UL communication, for DL communication, or, in some examples, resources that can be flexibly allocated for either UL or DL communication. The processor 1204 may further include resource scheduling circuitry 1242 configured (e.g., in connection with resource scheduling instructions 1254) for various functions, including, for example, determining and communicating to one or more UEs a resource allocation (e.g., a grant) for one or more slots or for one or more carriers.

The processor 1204 is responsible for managing the bus 1202 and general processing, including the execution of software stored on the computer-readable medium 1206. The software may include slot formatting instructions 1252 and resource scheduling instructions 1254. The software, when executed by the processor 1204, causes the processing system 1214 to perform the various functions described below for any particular apparatus. As an example, processor 1204 may use the slot formatting circuit 1240 to determine sequences of slots including any suitable combination of TDD and SB-FD slots as described herein and prioritize HARQ-ACK processes for those slots, accounting for the slot format of the various slots and the priority of communications associated with those slots. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 13:
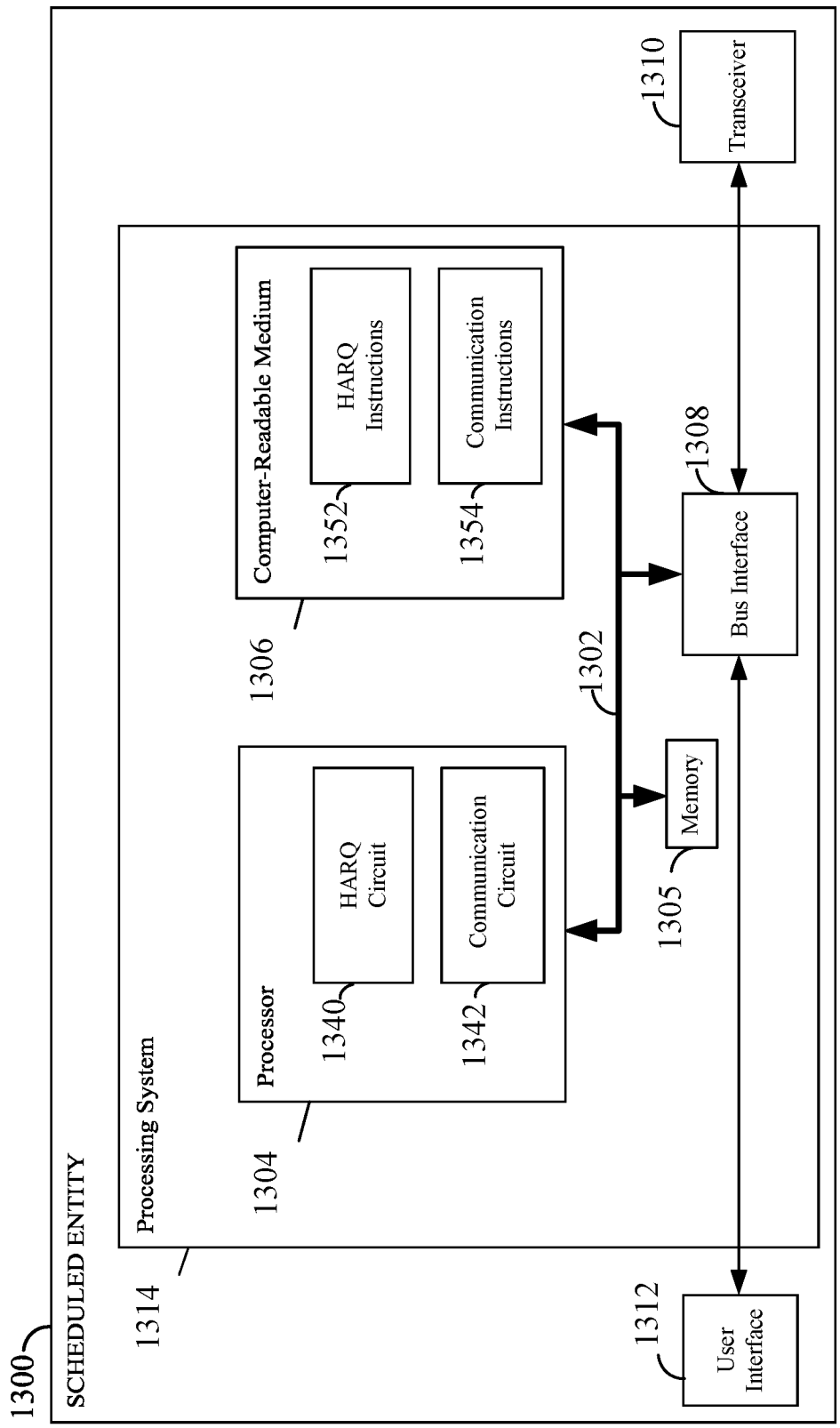
FIG. 13 is a block diagram conceptually illustrating an example of a hardware implementation for a scheduled entity according to some aspects.

FIG. 13 is a conceptual diagram illustrating an example of a hardware implementation for an exemplary scheduled entity 1300 employing a processing system 1314. In accordance with various aspects of the disclosure, a processing system 1314 that includes one or more processors 1304 may implement an element, or any portion of an element, or any combination of elements. For example, the scheduled entity 1300 may be a UE as illustrated in any one or more of FIGS. 1 and/or 2.

The processing system 1314 may be substantially the same as the processing system 1214 illustrated in FIG. 12, including a bus interface 1308, a bus 1302, memory 1305, a processor 1304, and a computer-readable medium 1306. Furthermore, the scheduled entity 1300 may include a user interface 1312 and a transceiver 1310 substantially similar to those described above in FIG. 12. That is, the processor 1304, as utilized in a scheduled entity 1300, may be used to implement any one or more of the processes described below and illustrated in FIGS. 14-20

In some aspects of the disclosure, the processor 1304 may include a HARQ circuit 1340 configured for various functions, including, for example, handling communications associated with one or more active HARQ processes, calculating slot offsets for one or more active HARQ processes, and/or determining whether ACKs or NACKs should be sent based on one or more TBs and/or CRCs (e.g., of a received) PDSCH. For example, the HARQ circuit 1340 may be configured (e.g., in connection with HARQ instructions 1352) to implement one or more of the functions described below in relation to FIGS. 14-18. The processor 1304 may further include a communication controller 1342 configured (e.g., in connection with communication instructions 1354) for various functions, including, for example, communicating over one or more wireless carriers.

UE DL HARQ Procedure

Some aspects of the present disclosure provide mechanisms and algorithms to handle communications related to one or more active HARQ processes for frame structures that include both TDD slots and SB-FD slots.

While the description that follows refers to FIGS. 14-18, which illustrate processes that take place at a UE, it is to be understood that this disclosure is not limited to operations or processes at a UE. That is, the description that follows also describes processes and operations that take place at a base station, and the present disclosure is written to fully disclose operations at both endpoints of a signaling exchange between said UE and base station.

Figure 14:
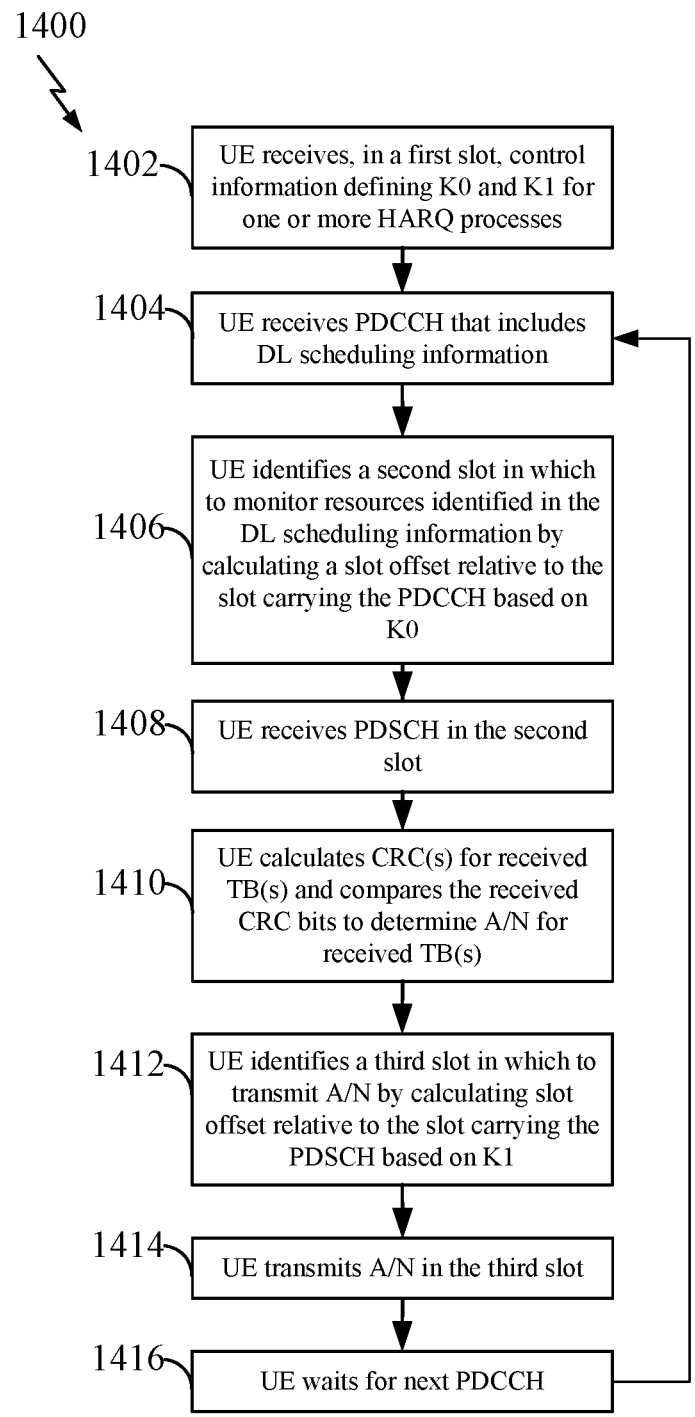
FIG. 14 is a flow chart illustrating an exemplary process for a UE to communicate using one or more downlink HARQ processes over a flexible duplex carrier that includes both TDD and SB-FD slots, according to some aspects.

FIG. 14 is a flow chart illustrating an exemplary process 1400 for a UE to perform communication operations in association with one or more DL HARQ processes. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 1400. In some examples, any suitable apparatus or means for carrying out the functions or algorithm described below may carry out the process 1400. In some examples, the process 1400 may be carried out by the scheduled entity or UE 1300 illustrated in FIG. 13.

In some examples, the process 1400 may be carried out by any suitable apparatus or means for carrying out the functions or algorithm described below. In one example, the process 1400 may be performed by a processor such as the processor 1304 of the scheduled entity 1300 (e.g., a UE), using HARQ processing circuitry and a communication controller (e.g., HARQ circuit 1340 and the communication controller 1342) executing computer-readable instructions (e.g., the HARQ instructions 1352 and the communication instructions 1354).

As described above, according to some examples, at block 1402 the UE may receive control information (e.g., via DCI, RRC signaling, and/or another applicable control signaling) from a base station using a communication controller (e.g., the communication controller 1342) via a transceiver (e.g., the transceiver 1310). The control information defines a slot offset parameter $K_0$ and a HARQ timing parameter $K_1$ for one or more HARQ processes in connection with a frame structure having both TDD slots and SB-FD slots.

At block 1404, the UE receives a PDCCH in a first slot via the transceiver using the communication controller. The PDCCH includes DL scheduling information. For example, the DL scheduling information may define resource blocks in which the base station is to send a PDSCH to the UE.

At block 1406, the UE identifies a second slot in which to monitor resources identified in the DL scheduling information by calculating a slot offset relative to the first slot carrying the PDCCH based on the slot offset parameter $K_0$. In some aspects of the present disclosure, the UE may be configured to consider all slot duplex types (e.g., slots having SB-FD slot duplex types and slots having TDD slot duplex types) when calculating the slot offset. In other aspects of the present disclosure, the UE may be configured to consider only some slot duplex types (e.g., only slots having SB-FD slot duplex types or only slots having TDD slot duplex types) when calculating the slot offset, and may exclude other slot duplex types from consideration.

At block 1408, the UE receives, using the communication controller and the transceiver, a PDSCH in the second slot. The PDSCH may include one or more TBs and one or more CRCs for error detection.

At block 1410, the UE calculates, using the HARQ circuitry, one or more CRCs for the TB(s) of the PDSCH. The UE uses the HARQ circuitry to compare the calculated CRC(s) to the received CRC(s) to determine whether the UE should transmit an ACK or a NACK to the base station. For example, if the UE determines that the compared CRCs match, the UE may determine that the UE should transmit an ACK to the base station for the received TB(s). For example, if the UE determines that the compared CRCs do not match, the UE may determine that the UE should transmit a NACK to the base station for the received TB(s).

At block 1412, the UE identifies a third slot in which to transmit the ACK/NACK by calculating a slot offset relative to the slot carrying the PDSCH (i.e., the first slot) based on the HARQ timing parameter $K_1$. As indicated above, in some instances the UE may be configured to exclude or "skip" slots of a given slot duplex type when calculating slot offsets. In other instances, the UE may be configured to count slots of all slot duplex types when calculating slot offsets.

At block 1414, the UE transmits the ACK/NACK, generated using the HARQ circuitry, to the base station in the third slot.

At block 1416, the UE waits to receive the next PDCCH from the base station. The process returns to block 1404 once the UE receives the next PDCCH from the base station.

It will be appreciated that certain aspects of the example process 1400 and other processes described herein may be related to, and may implicitly describe, features or operation of a scheduling entity such as a base station in communication with the UE described above. For example, a base station may generate or otherwise receive desired slot offsets for various HARQ processes to be performed by a UE on downlink data received from the base station. As an additional example, a base station may determine (or receive) the format of a bitmap usable by the UE to select between different HARQ-ACK scheduling behaviors as described herein. As a further example, a base station may determine prioritizations of various HARQ-ACK processes or receive requested prioritizations from a network or another device such as the UE and communicate desired slot offsets for HARQ-ACK processes based on those prioritizations to the UE.

UE UL HARQ Procedure

Figure 15:
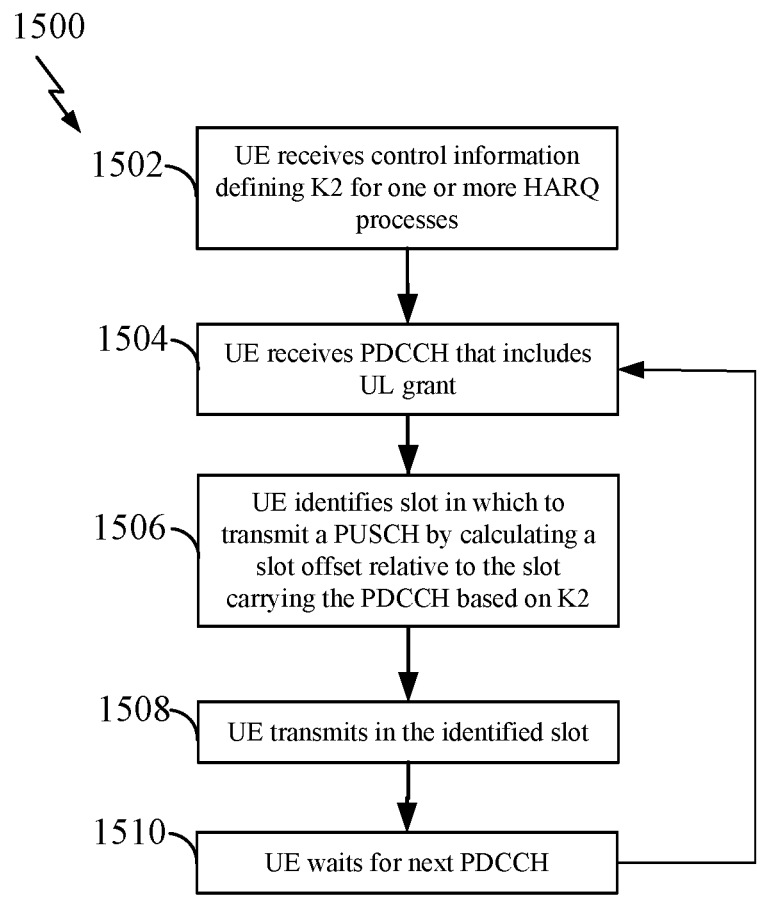
FIG. 15 is a flow chart illustrating an exemplary process for a UE to communicate using one or more uplink HARQ processes over a flexible duplex carrier that includes both TDD and SB-FD slots, according to some aspects.

FIG. 15 is a flow chart illustrating an exemplary process 1500 for a UE to perform communication operations in association with one or more UL HARQ processes. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 1500. In some examples, any suitable apparatus or means for carrying out the functions or algorithm described below may carry out the process 1500.

In some examples, the process 1500 may be carried out by any suitable apparatus or means for carrying out the functions or algorithm described below. In one example, the process 1500 may be performed by a processor such as the UE 1304 of the scheduled entity 1300, using HARQ processing circuitry and a communication controller (e.g., HARQ circuit 1340 and the communication controller 1342) executing computer-readable instructions (e.g., the HARQ instructions 1352 and the communication instructions 1354).

As described above, according to some examples, at block 1502 the UE receives control information (e.g., via DCI, RRC signaling, and/or another applicable control signaling) from a base station using a transceiver (e.g., the transceiver 1310) and a communication controller. The control information defines a slot offset parameter $K_2$ for one or more HARQ processes in connection with a frame structure that includes both TDD slots and SB-FD slots.

At block 1504, the UE receives, from the base station via the transceiver, a PDCCH that includes a UL grant. For example, the UL grant may define resources in which the UE is to transmit a PUSCH to the base station.

At block 1506, the UE identifies a slot in which to transmit the PUSCH (e.g., in resources identified in the UL grant) by calculating a slot offset relative to the slot carrying the PDCCH based on the slot offset parameter $K_2$. In some aspects of the present disclosure, the UE may be configured to consider all slot duplex types (e.g., SB-FD slot duplex types and TDD slot duplex types) when calculating the slot offset. In other aspects of the present disclosure, the UE may be configured to consider only some slot duplex types (e.g., only slots having SB-FD slot duplex types or only slots having TDD slot duplex types) when calculating the slot offset, and may exclude other slot duplex types from consideration.

At block 1508, the UE uses the communication controller to transmit the PUSCH to the base station in the slot via the transceiver.

At block 1510, the UE waits to receive the next PDCCH from the base station. The UE returns to block 1504 once the UE receives the next PDCCH from the base station.

UE HARQ Procedures with SB-FD-Exclusive and TDD-Exclusive HARQ Process Groups

Figure 16:
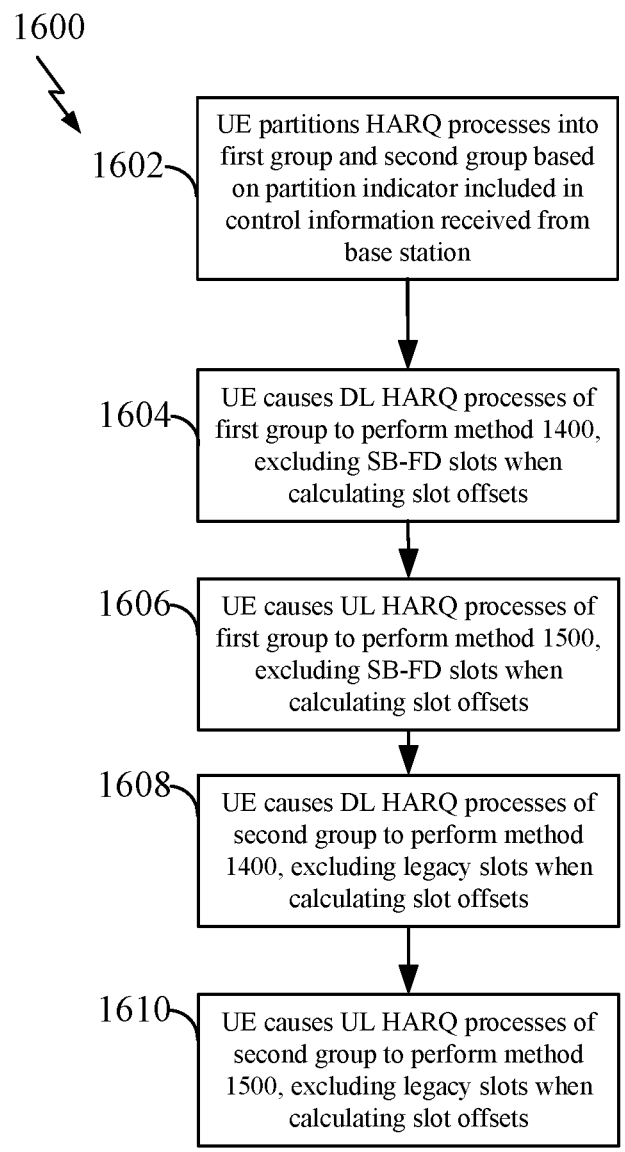
FIG. 16 is a flow chart illustrating an exemplary process for a UE to partition HARQ processes into two groups, with the UE calculating slot offsets for a first group based only on TDD slots, and calculating slot offsets for the second group based only on SB-FD slots, according to some aspects.

FIG. 16 is a flow chart illustrating an exemplary process 1600 for a UE to perform communication operations in association with a first group of HARQ processes and a second group of HARQ processes. For the first group of HARQ processes, the UE is configured to exclude SB-FD slots (i.e., slots having a SB-FD slot duplex type) when performing slot offset calculations. For the second group of HARQ processes, the UE is configured to exclude TDD slots (i.e., slots having a TDD slot duplex type) when performing slot offset calculations. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 1600. In some examples, any suitable apparatus or means for carrying out the functions or algorithm described below may carry out the process 1600. In some examples, in addition to the first and second groups of HARQ processes, the UE may also manage additional HARQ processes without regard for slot duplex types, as described above, in connection with FIG. 9.

In some examples, the process 1600 may be carried out by any suitable apparatus or means for carrying out the functions or algorithm described below. In one example, the process 1600 may be performed by a processor such as the UE 1304 of the scheduled entity 1300, using HARQ processing circuitry and a communication controller (e.g., HARQ circuit 1340 and the communication controller 1342) executing computer-readable instructions (e.g., the HARQ instructions 1352 and the communication instructions 1354).

At block 1602 the UE may assign HARQ processes to either a first group or a second group based on a partition indicator using the HARQ circuitry. The UE may receive control information (e.g., DCI, RRC signaling, or other control information) that includes the partition indicator from a base station using the communication controller and a transceiver (e.g., the transceiver 1310). In the present example, when performing the HARQ processes of the first group, the UE is configured to exclude SB-FD slots from slot offset calculations. When performing the HARQ processes of the second group, the UE is configured to exclude TDD slots from slot offset calculations.

At block 1604, the UE, for DL HARQ processes of the first group, performs the process 1400 of FIG. 14, while excluding SB-FD slots when calculating slot offsets.

At block 1606, the UE, for UL HARQ processes of the first group, performs the process 1500 of FIG. 15, while excluding SB-FD slots when calculating slot offsets.

At block 1608, the UE, for DL HARQ processes of the second group, performs the process 1400 of FIG. 14, while excluding TDD slots when calculating slot offsets.

At block 1610, the UE, for UL HARQ processes of the second group, performs the process 1500 of FIG. 15, while excluding TDD slots when calculating slot offsets.

It should be understood that the order in which blocks 1604-1610 are shown to be performed here is illustrative, not limiting. The blocks 1604-1610 may be performed in any desired order.

It will be appreciated that performing the process 1600 may be used to separate a plurality of HARQ processes into two subsets: a first subset where HARQ scheduling parameters are calculated with respect to TDD slots only, and a second subset where HARQ scheduling parameters are calculated with respect to SB-FD slots only. In some examples, the HARQ processes belonging to the first subset may operate on TDD slots only, and the HARQ processes belonging to the second subset may operate on SB-FD slots only. By contrast, in other examples disclosed previously, HARQ process scheduling may operate without differentiation between TDD, SB-FD, and other slot formats.

Figure 17:
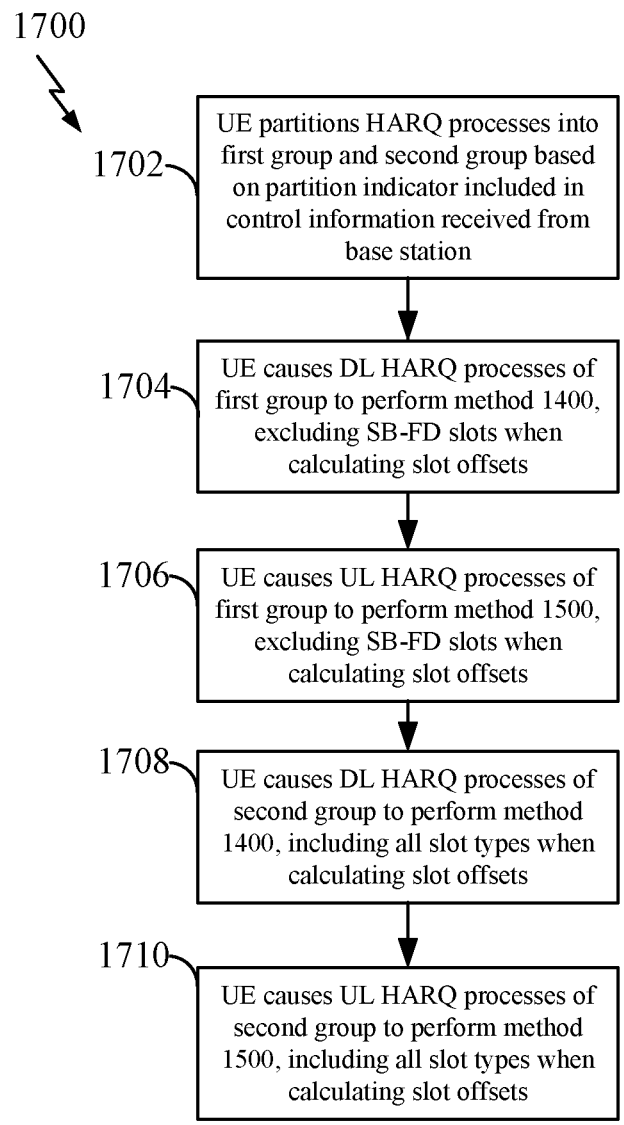
FIG. 17 is a flow chart illustrating an exemplary process for a UE to partition HARQ processes into two groups, with the UE calculating slot offsets for a first group based only on TDD slots, and calculating slot offsets for the second group based both TDD and SB-FD slots, according to some aspects.

UE HARQ Procedures with SB-FD-Exclusive and Fully Inclusive HARQ Process Partitions FIG. 17 is a flow chart illustrating an exemplary process 1700 for a UE to perform communication operations in association with a first group of HARQ processes and a second group of HARQ processes. For the first group of HARQ processes, the UE is configured to exclude SB-FD slots (i.e., slots having a SB-FD slot duplex type) when performing slot offset calculations. For the second group of HARQ processes, the UE is configured to perform slot offset calculations irrespective of slot duplex type. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 1700. In some examples, any suitable apparatus or means for carrying out the functions or algorithm described below may carry out the process 1700.

In some examples, the process 1700 may be carried out by any suitable apparatus or means for carrying out the functions or algorithm described below. In one example, the process 1700 may be performed by a processor such as the UE 1304 of the scheduled entity 1300, using HARQ processing circuitry and a communication controller (e.g., HARQ circuit 1340 and the communication controller 1342) executing computer-readable instructions (e.g., the HARQ instructions 1352 and the communication instructions 1354).

At block 1702 the processor assigns HARQ processes to either a first group or a second group based on a partition indicator. The UE may receive control information (e.g., DCI, RRC signaling, or other control information) including the partition indicator from a base station using the communication controller and a transceiver (e.g., the transceiver 1310). In the present example, for the HARQ processes of the first group, the UE is configured (including its HARQ circuitry) to exclude SB-FD slots from slot offset calculations. For the HARQ processes of the second group, the UE is configured (including its HARQ circuitry) to perform slot offset calculations irrespective of slot duplex type.

At block 1704, the UE, for DL HARQ processes of the first group, performs the process 1400 of FIG. 14, while excluding SB-FD slots when calculating slot offsets.

At block 1706, the UE, for UL HARQ processes of the first group, performs the process 1500 of FIG. 15, while excluding SB-FD slots when calculating slot offsets.

At block 1708, the UE, for DL HARQ processes of the second group, performs the process 1400 of FIG. 14, irrespective of slot duplex type.

At block 1710, the UE, for UL HARQ processes of the second group, performs the process 1500 of FIG. 15, irrespective of slot duplex type.

It should be understood that the order in which blocks 1704-1710 are shown to be performed here is illustrative, not limiting. The blocks 1704-1710 may be performed in any desired order.

It will be appreciated that performing the process 1700 may be used to separate a plurality of HARQ processes into two subsets: a first subset where HARQ scheduling parameters are calculated with respect to TDD slots only, and a second subset where HARQ scheduling parameters are calculated without differentiation between TDD, SB-FD and/or other slot formats. In some examples, the HARQ processes belonging to the first subset may operate on TDD slots only, and the HARQ processes belonging to the second subset may operate on both TDD and SB-FD slots. In some examples, the process 1700 and other processes disclosed herein may be performed as part of communication schemes capable of providing multiple communication service levels tailored to different devices and services over the same network resources. As a nonlimiting example, a network may provide an "enhanced Mobile Broadband" (eMBB) service level as well as an "Ultra Reliable Low Latency Communications" (URLLC) service level, as defined by release 16 of the 3GPP standards for 5G NR. In one particular non-limiting example, HARQ processes associated with eMBB data traffic may be assigned to the first sub-set described in connection with the process 1700 and HARQ processes associated with URLLC traffic may be assigned to the second subset described in connection with the process 1700.

UE Priority-Based HARQ Procedures

Figure 18:
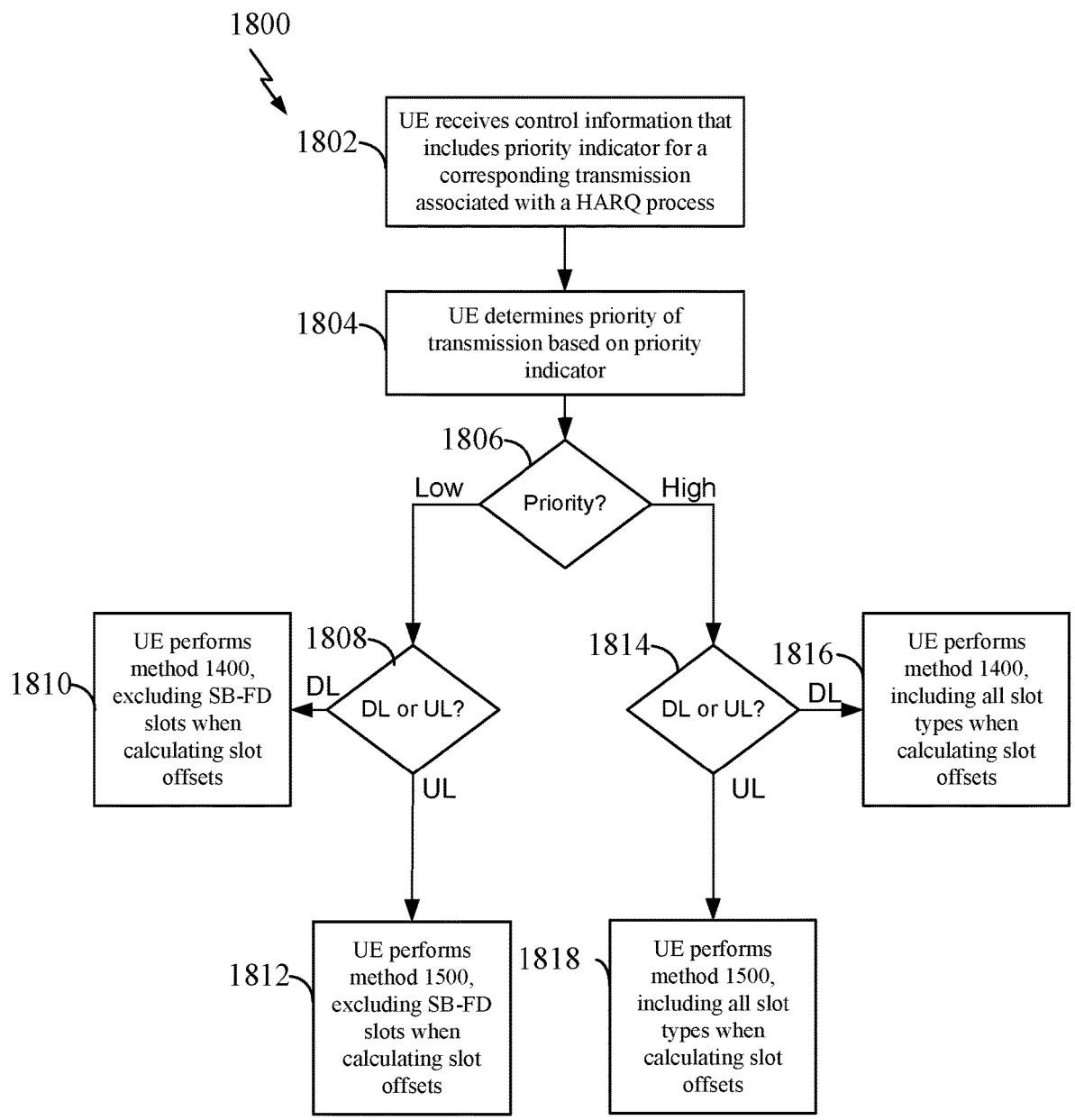
FIG. 18 is a flow chart illustrating an exemplary process for a UE to calculate slot offsets for low priority HARQ communications based only on TDD slots, and to calculate slot offsets for high priority HARQ communications based on both TDD and SB-FD slots, according to some aspects.

FIG. 18 is a flow chart illustrating an exemplary process 1800 for a UE to perform communication operations associated with an active HARQ process to handle a transmission having a defined priority. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 1800. In some examples, any suitable apparatus or means for carrying out the functions or algorithm described below may carry out the process 1800.

In some examples, the process 1800 may be carried out by any suitable apparatus or means for carrying out the functions or algorithm described below. In one example, the process 1800 may be performed by a processor such as the processor 1304 of the scheduled entity 1300 (i.e., the UE in this example), using HARQ processing circuitry and a communication controller (e.g., HARQ circuit 1340 and the communication controller 1342) executing computer-readable instructions (e.g., the HARQ instructions 1352 and the communication instructions 1354).

At block 1802 a UE receives control information (e.g., DCI, RRC signaling, or other applicable control information) that includes a priority indicator using the communication controller and a transceiver such as the transceiver 1310 coupled to the communication controller. The priority indicator may define a priority level of high or low for a corresponding transmission to be handled by the UE in connection with an active HARQ process. In the present example, for low priority transmissions, the processor is configured (including its HARQ circuitry) to exclude SB-FD slots from slot offset calculations. For high priority transmissions, the UE is configured (including its HARQ circuitry) to perform slot offset calculations irrespective of slot duplex type.

At block 1804, the UE determines the priority of the transmission based on the priority indicator.

At block 1806, if the UE determines that the priority of the transmission is low, the process proceeds to block 1808. Otherwise, if the UE determines that the priority of the transmission is high, the process proceeds to block 1814.

At block 1808, the UE determines (e.g., based on the control information) whether the transmission is for DL or UL. If the UE determines that the transmission is a DL transmission, the process proceeds to block 1810. Otherwise, if the UE determines that the transmission is a UL transmission, the process proceeds to block 1812.

At block 1810, the UE, in response to determining that the transmission is a low priority DL transmission, performs the process 1400 of FIG. 14, while excluding SB-FD slots when calculating slot offsets.

At block 1812, the UE, in response to determining that the transmission is a low priority UL transmission, performs the UE 1500 of FIG. 15, while excluding SB-FD slots when calculating slot offsets.

At block 1814, the UE determines (e.g., based on the control information) whether the transmission is for DL or UL. If the UE determines that the transmission is a DL transmission, the process proceeds to block 1816. Otherwise, if the UE determines that the transmission is a UL transmission, the process proceeds to block 1818.

At block 1816, the UE, in response to determining that the transmission is a high priority DL transmission, performs the UE 1400 of FIG. 14, irrespective of slot duplex type.

At block 1818, the UE, in response to determining that the transmission is a high priority UL transmission, performs the process 1500 of FIG. 15, irrespective of slot duplex type.

It will be appreciated that performing the process 1800 may be used to separate a plurality of HARQ processes into two subsets: a first subset where HARQ scheduling parameters are calculated with respect to TDD slots only when a relatively low priority is assigned, and a second subset where HARQ scheduling parameters are calculated without differentiation between TDD, SB-FD and/or other slot formats, when a relatively high priority is assigned. In some examples, the HARQ processes belonging to the first subset may operate on TDD slots only, and the HARQ processes belonging to the second subset may operate on both TDD and SB-FD slots.

It will be appreciated that the methods described above and devices implementing those methods may be used to confer certain technological advantages, including enabling both higher bandwidth communications and lower-latency communications for different types of devices or users of those devices. In addition improvements in overall network capacity and performance metrics may be realized by prioritizing communications requiring particularly low-latency over lower-priority communications, ensuring that service level targets may be met for an array of different devices without requiring investments in lowering latency for all connected devices or increasing the bandwidth available to every prospective device that may connect to a wireless communication network. Furthermore, the level of service provided to each connected device need not be static and may be adjusted based on input from a user or without human intervention by employing computational techniques known in the art, including machine learning techniques to provide differing levels of service tailored to the needs of individuals devices at various points in time.

Figure 19:
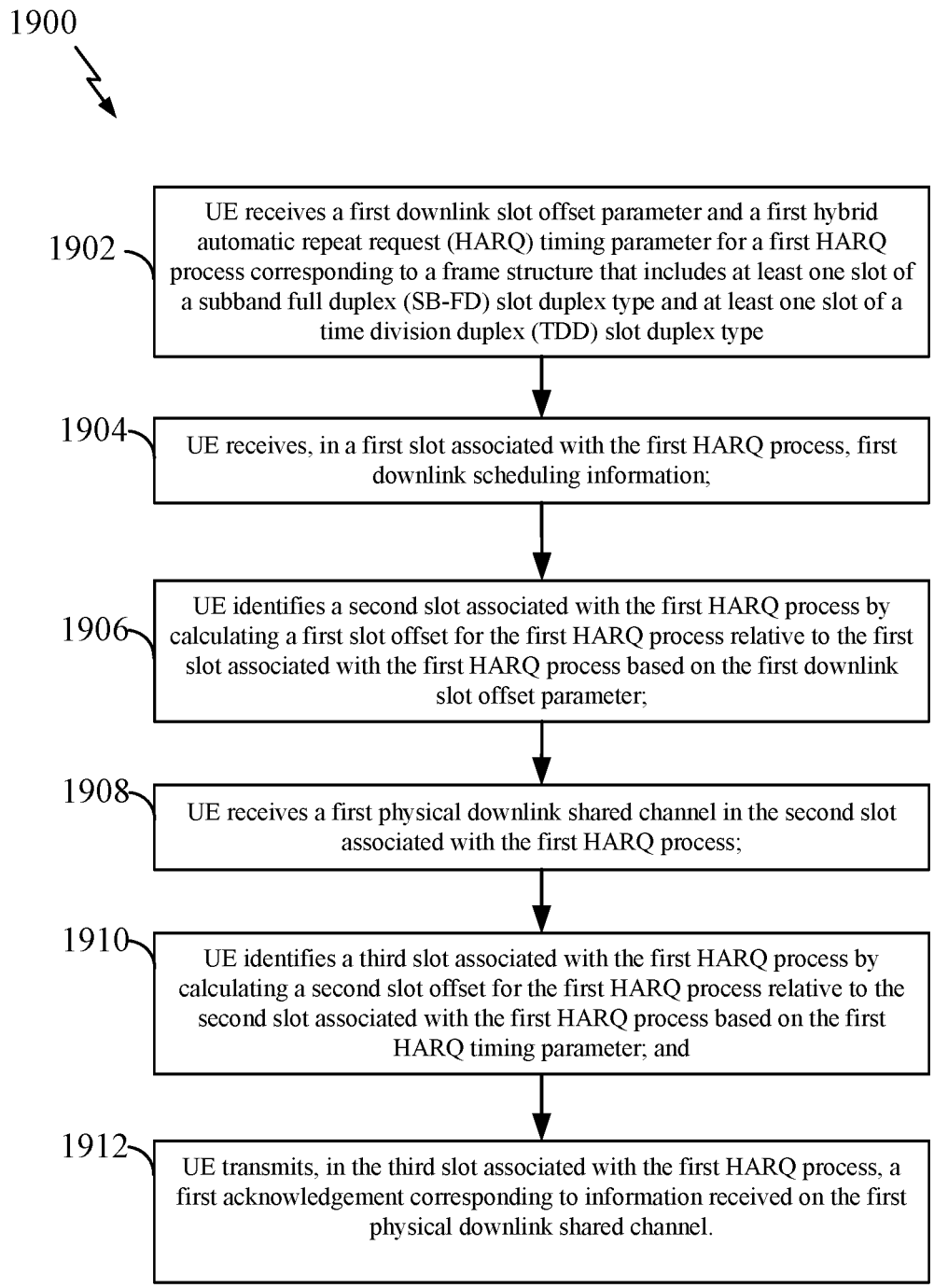
FIG. 19 is a flow chart illustrating another exemplary process for a UE to schedule HARQ-ACK transmissions when the UE communicates using TDD and SB-FD slots according to some aspects.

Additional Example Procedures:

FIG. 19 is a flow chart illustrating an exemplary process 1900 for a UE to perform communication operations associated with an active HARQ process to handle transmissions associated with a frame structure having TDD and SB-FD slots. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 1900. In some examples, any suitable apparatus or means for carrying out the functions or algorithm described below may carry out the process 1900.

In some examples, the process 1900 may be carried out by any suitable apparatus or means for carrying out the functions or algorithm described below. In one example, the process 1900 may be performed by a processor such as the UE 1304 of the scheduled entity 1300, using HARQ processing circuitry and a communication controller (e.g., the HARQ circuit 1340 and the communication controller 1342) executing computer-readable instructions (e.g., the HARQ instructions 1352 and the communication instructions 1354) as well as a transceiver (e.g., the transceiver 1310) coupled to the a communication controller.

At block 1902 the UE may receive, using the a communication controller and the transceiver, a first downlink slot offset parameter and a first hybrid automatic repeat request (HARQ) timing parameter for a first HARQ process corresponding to a frame structure that includes at least one slot of a subband full duplex (SB-FD) slot duplex type and at least one slot of a time division duplex (TDD) slot duplex type.

At block 1904 the UE receives, in a first slot associated with the first HARQ process, using the communication controller and the transceiver, first downlink scheduling information.

At block 1906, the UE identifies a second slot associated with the first HARQ process by calculating a first slot offset for the first HARQ process relative to the first slot associated with the first HARQ process based on the first downlink slot offset parameter.

At block 1908, the UE receives a first physical downlink shared channel (PDSCH) in the second slot associated with the first HARQ process;

At block 1910, the UE identifies a third slot associated with the first HARQ process by calculating a second slot offset for the first HARQ process relative to the second slot associated with the first HARQ process based on the first HARQ timing parameter; and At block 1912, the UE uses the communication controller and transceiver to transmit, in the third slot associated with the first HARQ process, a first acknowledgement generated using the HARQ circuitry corresponding to information received on the first PDSCH.

Figure 20:
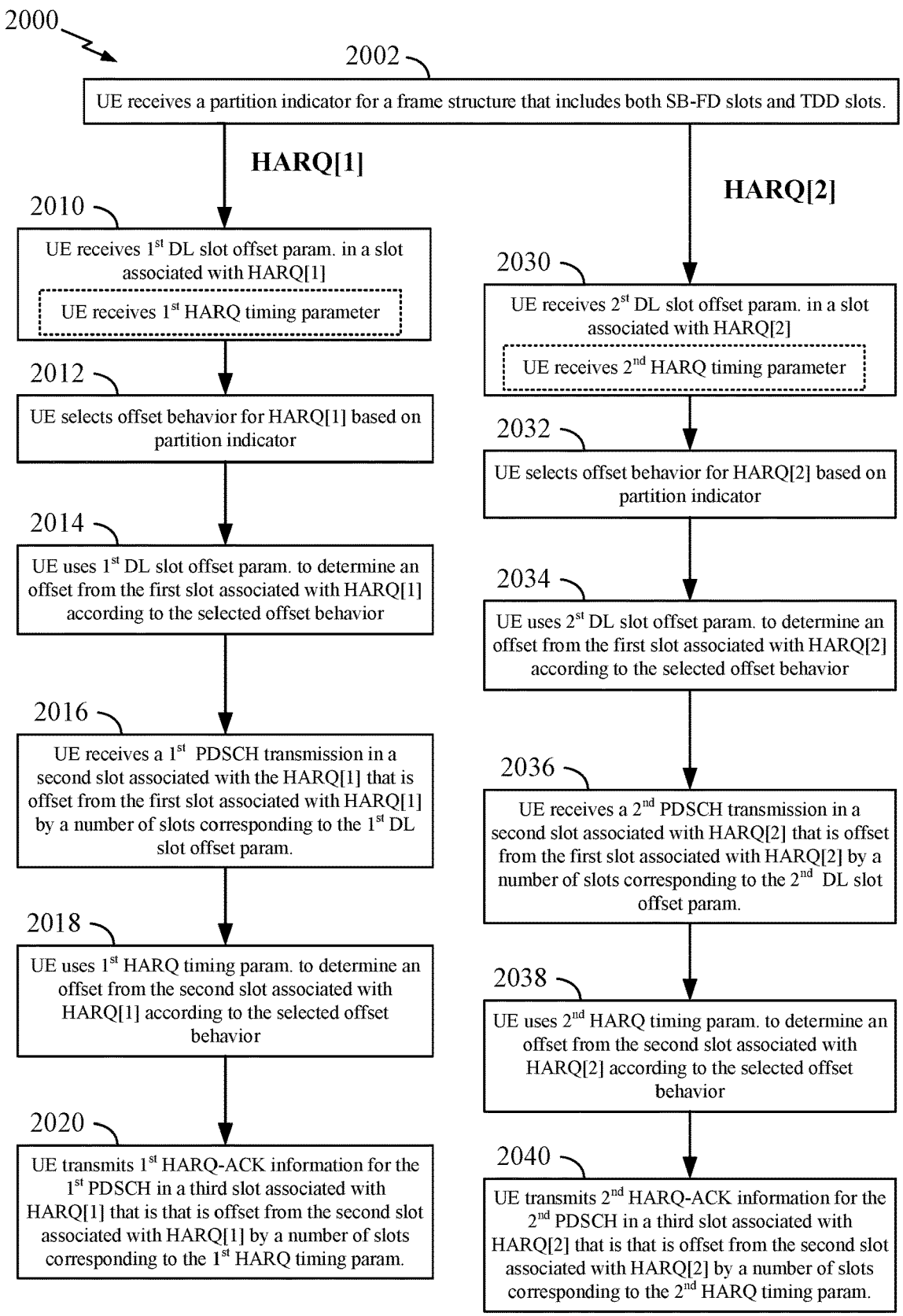
FIG. 20 is a flow chart illustrating yet another exemplary process for a UE to schedule HARQ-ACK transmissions when the UE communicates using TDD and SB-FD slots according to some aspects.

FIG. 20 is a flow chart illustrating another exemplary process 2000 for a UE to perform communication operations associated with an active HARQ process to handle transmissions associated with a frame structure having TDD and SB-FD slots. As described below, some or all illustrated features may be omitted in a particular implementation within the scope of the present disclosure, and some illustrated features may not be required for implementation of all embodiments. In some examples, the scheduled entity or UE 1300 illustrated in FIG. 13 may carry out the process 2000. In some examples, any suitable apparatus or means for carrying out the functions or algorithm described below may carry out the process 2000.

In some examples, the process 2000 may be carried out by any suitable apparatus or means for carrying out the functions or algorithm described below. In one example, the process 2000 may be performed by a processor such as the UE 1304 of the scheduled entity 1300, using HARQ processing circuitry and a communication controller (e.g., HARQ circuit 1340 and the communication controller 1342) executing computer-readable instructions (e.g., the HARQ instructions 1352 and the communication instructions 1354) as well as a transceiver (e.g., the transceiver 1310) coupled to the communication controller.

At block 2002 the UE receives UE receives a partition indicator for a frame structure that includes both SB-FD slots and TDD slots. In this example, the UE is configured to operate two HARQ processes, denoted "HARQ[1]" and "HARQ[2]." The UE subsequently proceeds to both blocks 2010-2020 where the UE preforms actions associated with HARQ[1] and blocks 2030-2040 where the UE performs actions associated with HARQ[2].

At block 2010, the UE receives a first downlink slot offset parameter in a first slot associated with HARQ[1]. The UE also optionally receives a first HARQ timing parameter (also associated with HARQ[1]) in the same slot. In some aspects, the UE may receive the first HARQ timing parameter in any other suitable slot or by any other suitable means.

At block 2012, the UEUE selects offset behavior for HARQ[1] based on the partition indicator received at block 2002. An offset behavior specifies how the UE should treat slots of different types (i.e., SB-FD and TDD) when calculating offsets between slots to determine when to expect a PDSCH associated with a given HARQ process and when to transmit HARQ-ACK information for that HARQ process relative to the slot in which the PDSCH is received. In one example offset behavior, the UE determines slot offsets irrespective of slot type. In another example offset behavior, the UE ignores SB-FD slots when determining slot offsets. In another example offset behavior, the UE ignores TDD slots when determining slot offsets.

At block 2014, the UE uses the first DL slot offset parameter to determine an offset from the first slot associated with HARQ[1] according to the selected offset behavior.

At block 2016, the UE receives a first PDSCH transmission in a second slot associated with the HARQ[1] that is offset from the first slot associated with HARQ[1] by a number of slots corresponding to the 1st DL slot offset parameter.

At block 2018, the UE uses the first HARQ timing parameter to determine an offset from the second slot associated with HARQ[1] according to the selected offset behavior for HARQ[1].

At block 2020, the UE transmits 1st HARQ-ACK information for the 1st PDSCH in a third slot associated with HARQ[1] that is that is offset from the second slot associated with HARQ[1] by a number of slots corresponding to the 1st HARQ timing parameter.

Meanwhile, at block 2030, the UE receives a second downlink slot offset parameter in a first slot associated with HARQ[2]. The UE also optionally receives a second HARQ timing parameter (also associated with HARQ[2]) in the same slot. In some aspects, the UE may receive the second HARQ timing parameter in any other suitable slot or by any other suitable means.

At block 2032, the UE selects an offset behavior for HARQ[2] based on the partition indicator received at block 2002, as described above in connection with block 2012.

At block 2034, the UE uses the second downlink slot offset parameter to determine an offset from the first slot associated with HARQ[2] according to the selected offset behavior for HARQ[2].

At block 2036, the UE receives a second PDSCH transmission in a second slot associated with HARQ[2]. The second slot associated with HARQ[2] is offset from the first slot associated with HARQ[2] by a number of slots corresponding to the second downlink slot offset parameter At block 2038, the UE uses the second HARQ timing parameter to determine an offset from the second slot associated with HARQ[2] according to the selected offset behavior for HARQ[2].

At block 2040, the UE transmits second HARQ-ACK information for the second PDSCH in a third slot associated with HARQ[2] that is that is offset from the second slot associated with HARQ[2] by a number of slots corresponding to the second HARQ timing parameter.

Further Examples Having a Variety of Features:

Example 1: A method, apparatus, and non-transitory computer-readable medium for wireless communication operable by a UE that includes receiving, in a first slot associated with a first hybrid automatic repeat request (HARQ) process, a first downlink slot offset parameter. The first HARQ process corresponds to a frame structure that includes one or more subband full duplex (SB-FD) slots and one or more time division duplex (TDD) slots. This example also includes receiving, a first physical downlink shared channel (PDSCH) transmission in a second slot associated with the first HARQ process. The second slot associated with the first HARQ process that is offset from the first slot associated with the first HARQ process by a number of slots corresponding to the first downlink slot offset parameter. This example also includes transmitting, in a third slot associated with the first HARQ process, first HARQ-ACK information indicating whether the UE successfully decoded the first PDSCH. The third slot associated with the first HARQ process is offset from the second slot associated with the first HARQ process by a number of slots corresponding to a first HARQ timing parameter.

Example 2: The method, apparatus, and non-transitory computer-readable medium of Example 1, further including, receiving, via the transceiver, the first HARQ timing parameter in the first slot associated with the first HARQ process. This example also includes receiving, in a first slot associated with a second HARQ process, a second downlink slot offset parameter and a second HARQ timing parameter for a second HARQ process corresponding to the frame structure. This example also includes receiving a second physical downlink shared channel in a second slot associated with the second HARQ process. The second slot associated with the second HARQ process is offset from the first slot associated with the second HARQ process by a number of slots corresponding to the second downlink slot offset parameter. This example also includes transmitting, in a third slot associated with the second HARQ process, a second acknowledgement corresponding to information received on the second PDSCH. The third slot associated with the second HARQ process is offset from the second slot associated with the second HARQ process by a number of slots corresponding to the second HARQ timing parameter. This example also includes receiving a partition indicator indicating a first offset behavior for the first HARQ process and a second offset behavior for the second HARQ process that is different from the first behavior. In this example, The number of slots corresponding to the first downlink slot offset parameter excludes any SB-FD slots between the first slot associated with the first HARQ process and the second slot associated with the first HARQ process, in accordance with the first offset behavior. In this example, the number of slots corresponding to the first HARQ timing parameter excludes any SB-FD between the second slot associated with the first HARQ process and the third slot associated with the first HARQ process, in accordance with the first offset behavior.

Example 3: The method, apparatus, and non-transitory computer-readable medium of Example 2, in which the number of slots corresponding to the second downlink slot offset parameter excludes any TDD slots between the first slot associated with the second HARQ process and the second slot associated with the second HARQ process, in accordance with the second offset behavior. In this example, the number of slots corresponding to the second HARQ timing parameter excludes any TDD slots between the second slot associated with the second HARQ process and the third slot associated with the second HARQ process, in accordance with the second offset behavior Example 4: The method, apparatus, and non-transitory computer-readable medium of Example 2 in which the number of slots corresponding to the second downlink slot offset parameter includes any TDD slots and any SB-FD slots between the first slot associated with the second HARQ process and the second slot associated with the second HARQ process. In this example, the number of slots corresponding to the second HARQ timing parameter includes any TDD and any SB-FD slots between the second slot associated with the second HARQ process and the third slot associated with the second HARQ process.

Example 5: The method, apparatus, and non-transitory computer-readable medium of Example 1, further including selecting an offset behavior from one of a first offset behavior for the first HARQ process or a second offset behavior for the first HARQ process based on contents of a message associated with at least the first HARQ process. In the first offset behavior, the number of slots corresponding to the first downlink slot offset parameter excludes any SB-FD slots between the first slot associated with the first HARQ process and the second slot associated with the first HARQ process; and the number of slots corresponding to the first HARQ timing parameter excludes any SB-FD slots between the second slot associated with the first HARQ process and the third slot associated with the first HARQ process. In the second offset behavior, the number of slots corresponding to the first downlink slot offset parameter includes any SB-FD slots between the first slot associated with the first HARQ process and the second slot associated with the first HARQ process; and the number of slots corresponding to the first HARQ timing parameter includes any SB-FD slots between the second slot associated with the first HARQ process and the third slot associated with the first HARQ process.

Example 6: The method, apparatus, and non-transitory computer-readable medium of Example 5, further including receiving, in a first slot associated with a second HARQ process corresponding to the frame structure, a second downlink slot offset parameter and a second hybrid automatic repeat request (HARQ) timing parameter for the second HARQ process. This example also includes receiving a second physical downlink shared channel in a second slot associated with the second HARQ process. The second slot associated with the second HARQ process is offset from the first slot associated with the second HARQ process by a number of slots corresponding the second downlink slot offset parameter. This example also includes transmitting, in a third slot associated with the second HARQ process, a second acknowledgement corresponding to information received on the second physical downlink shared channel. The third slot associated with the second HARQ process is offset from the second slot associated with the second HARQ process by a number of slots corresponding to the second HARQ timing parameter.

In this example, selecting the offset behavior includes selecting the first offset behavior for the first HARQ process based on the first priority; and selecting the second offset behavior for the second HARQ process based on the second priority. In this example, the number of slots corresponding to the second downlink slot offset, includes any SB-FD slots between the first slot associated with the second HARQ process and the second slot associated with the second HARQ process, in accordance with the second offset behavior; In this example, the number of slots corresponding to the second HARQ timing parameter includes any SB-FD slots between the second slot associated with second HARQ process and the third slot associated with the second HARQ process, in accordance with the second offset behavior.

Example 7: The method, apparatus, and non-transitory computer-readable medium of Example 1 in which the number of slots corresponding to the first downlink slot offset parameter includes any TDD slots between the first slot associated with the first HARQ process and the second slot associated with the first HARQ process and any SB-FD slots between the first slot associated with the first HARQ process and the second slot associated with the first HARQ process. In this example, the number of slots corresponding to the first HARQ timing parameter includes any TDD slots between the second slot associated with the first HARQ process and the third slot associated with the first HARQ process and SB-FD slots between the second slot associated with the first HARQ process and the third slot associated with the first HARQ process.

Several aspects of a wireless communication network have been presented with reference to an exemplary implementation. As those skilled in the art will readily appreciate, various aspects described throughout this disclosure may be extended to other telecommunication systems, network architectures, and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features, and/or functions illustrated in FIGS. 1-20 may be rearranged and/or combined into a single component, step, feature, or function or embodied in several components, steps, or functions.

Additional elements, components, steps, and/or functions may also be added without departing from novel features disclosed herein. The apparatus, devices, and/or components illustrated in FIGS. 1-20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." The terms "may" and "can" as used in connection with aspects and features herein are equivalent and refer to elements which are present in certain aspects but not necessarily others, or to describe actions that are performed by a particular device or component in one aspect that are capable of being performed by other devices or components in aspects.

Moreover, it will be appreciated that in some examples, one or more devices described as performing processes described herein (or any other suitable device) are tangibly configured to perform all or part of one or more of the processes prior to performing actions described herein.

What is claimed is:

1. A method of wireless communication operable by user equipment (a UE), comprising:
   receiving, via a transceiver, in a first slot associated with a first hybrid automatic repeat request (HARQ) process, a first downlink slot offset parameter, the first HARQ process corresponding to a frame structure that includes one or more subband full duplex (SB-FD) slots and one or more time division duplex (TDD) slots;
   receiving, via the transceiver, a first transmission in a second slot associated with the first HARQ process that is offset from the first slot associated with the first HARQ process by one or more slots corresponding to the first downlink slot offset parameter; and
   transmitting, via the transceiver, in a third slot associated with the first HARQ process that is offset from the second slot associated with the first HARQ process by one or more slots corresponding to a first HARQ timing parameter, first HARQ-Acknowledgement (HARQ-ACK) information indicating whether the UE successfully decoded the first transmission.

2. The method of claim 1, wherein the first transmission comprises a grant of resources.

3. The method of claim 1, wherein the first transmission comprises a physical downlink shared channel (PDSCH) transmission.

4. The method of claim 1, further comprising:
   receiving, via the transceiver, the first HARQ timing parameter in the first slot associated with the first HARQ process;
   receiving, via the transceiver, in a first slot associated with a second HARQ process, a second downlink slot offset parameter and a second HARQ timing parameter for a second HARQ process corresponding to the frame structure;
   receiving, via the transceiver, a second transmission in a second slot associated with the second HARQ process that is offset from the first slot associated with the second HARQ process by one or more slots corresponding to the second downlink slot offset parameter;
   transmitting, via the transceiver, in a third slot associated with the second HARQ process that is offset from the second slot associated with the second HARQ process by one or more slots corresponding to the second HARQ timing parameter, a second acknowledgement corresponding to information received in the second transmission; and
   receiving, via the transceiver, a partition indicator indicating a first offset behavior for the first HARQ process and a second offset behavior for the second HARQ process that is different from the first behavior;
   wherein:
      the one or more slots corresponding to the first downlink slot offset parameter excludes any SB-FD slots between the first slot associated with the first HARQ process and the second slot associated with the first HARQ process, in accordance with the first offset behavior; and
      the one or more slots corresponding to the first HARQ timing parameter excludes any SB-FD between the second slot associated with the first HARQ process and the third slot associated with the first HARQ process, in accordance with the first offset behavior.

5. The method of claim 4, wherein the second transmission comprises a grant of resources.

6. The method of claim 4, wherein the second transmission comprises a physical downlink shared channel (PDSCH) transmission.

7. The method of claim 4, wherein:
   the one or more slots corresponding to the second downlink slot offset parameter excludes any TDD slots between the first slot associated with the second HARQ process and the second slot associated with the second HARQ process, in accordance with the second offset behavior; and
   the one or more slots corresponding to the second HARQ timing parameter excludes any TDD slots between the second slot associated with the second HARQ process and the third slot associated with the second HARQ process, in accordance with the second offset behavior.

8. The method of claim 4, wherein:
the one or more slots corresponding to the second downlink slot offset parameter includes any TDD slots and any SB-FD slots between the first slot associated with the second HARQ process and the second slot associated with the second HARQ process; and
the one or more slots corresponding to the second HARQ timing parameter includes any TDD and any SB-FD slots between the second slot associated with the second HARQ process and the third slot associated with the second HARQ process.

9. The method of claim 1, further comprising:
selecting an offset behavior from one of the following offset behaviors based on contents of a message associated with at least the first HARQ process:
a first offset behavior for the first HARQ process, wherein:
the one or more slots corresponding to the first downlink slot offset parameter excludes any SB-FD slots between the first slot associated with the first HARQ process and the second slot associated with the first HARQ process; and
the one or more slots corresponding to the first HARQ timing parameter excludes any SB-FD slots between the second slot associated with the first HARQ process and the third slot associated with the first HARQ process;
or
a second offset behavior for the first HARQ process, wherein:
the one or more slots corresponding to the first downlink slot offset parameter includes any SB-FD slots between the first slot associated with the first HARQ process and the second slot associated with the first HARQ process; and
the one or more slots corresponding to the first HARQ timing parameter includes any SB-FD slots between the second slot associated with the first HARQ process and the third slot associated with the first HARQ process.

10. The method of claim 9, the method further comprising:
receiving, via the transceiver, in a first slot associated with a second HARQ process corresponding to the frame structure, a second downlink slot offset parameter and a second hybrid automatic repeat request (HARQ) timing parameter for the second HARQ process;
receiving, via the transceiver, a second physical downlink shared channel in a second slot associated with the second HARQ process that is offset from the first slot associated with the second HARQ process by one or more slots corresponding the second downlink slot offset parameter; and
transmitting, via the transceiver, in a third slot associated with the second HARQ process that is offset from the second slot associated with the second HARQ process by one or more slots corresponding to the second HARQ timing parameter, a second acknowledgement corresponding to information received on the second physical downlink shared channel;
wherein the message indicates a first priority associated with the first HARQ process; and that the message also indicates a second priority associated with the second HARQ process that is different from the first priority; and wherein selecting the offset behavior further comprises:
selecting the first offset behavior for the first HARQ process based on the first priority; and
selecting the second offset behavior for the second HARQ process based on the second priority;
wherein the one or more slots corresponding to the second downlink slot offset, includes any SB-FD slots between the first slot associated with the second HARQ process and the second slot associated with the second HARQ process, in accordance with the second offset behavior; and
wherein the one or more slots corresponding to the second HARQ timing parameter includes any SB-FD slots between the second slot associated with second HARQ process and the third slot associated with the second HARQ process, in accordance with the second offset behavior.

11. The method of claim 1, wherein:
the one or more slots corresponding to the first downlink slot offset parameter includes any TDD slots between the first slot associated with the first HARQ process and the second slot associated with the first HARQ process and any SB-FD slots between the first slot associated with the first HARQ process and the second slot associated with the first HARQ process; and
the one or more slots corresponding to the first HARQ timing parameter includes any TDD slots between the second slot associated with the first HARQ process and the third slot associated with the first HARQ process and SB-FD slots between the second slot associated with the first HARQ process and the third slot associated with the first HARQ process.

12. A wireless communication device operable as user equipment (a UE), comprising:
one or more processors;
memory coupled to the one or more processors; and
a transceiver coupled to the one or more processors;
wherein the one or more processors are configured to cause the UE to:
receive, via the transceiver, in a first slot associated with a first hybrid automatic repeat request (HARQ) process, a first downlink slot offset parameter, the first HARQ process corresponding to a frame structure that includes one or more subband full duplex (SB-FD) slots and one or more time division duplex (TDD) slots;
receive, via the transceiver, a first transmission in a second slot associated with the first HARQ process that is offset from the first slot associated with the first HARQ process by one or more slots corresponding to the first downlink slot offset parameter; and
transmit, via the transceiver, in a third slot associated with the first HARQ process that is offset from the second slot associated with the first HARQ process by one or more slots corresponding to a first HARQ timing parameter, first HARK-Acknowledgement (HARQ-ACK) information indicating whether the UE successfully decoded the first transmission.

13. The wireless communication device of claim 12, wherein the first transmission comprises a grant of resources.

14. The wireless communication device of claim 12, wherein the first transmission comprises a physical downlink shared channel (PDSCH) transmission.

15. The wireless communication device of claim 12, wherein the one or more processors are further configured to cause the UE to:

receive, via the transceiver, first HARQ timing parameter in the first slot associated with the first HARQ process;

receive, via the transceiver, in a first slot associated with a second HARQ process, a second downlink slot offset parameter and a second HARQ timing parameter for a second HARQ process corresponding to the frame structure;

receive, via the transceiver, a second transmission in a second slot associated with the second HARQ process that is offset from the first slot associated with the second HARQ process by one or more slots corresponding to the second downlink slot offset parameter;

transmit, via the transceiver, in a third slot associated with the second HARQ process that is offset from the second slot associated with the second HARQ process by one or more slots corresponding to the second HARQ timing parameter, a second acknowledgement corresponding to information received in the second transmission; and receive, via the transceiver a partition indicator indicating a first offset behavior for the first HARQ process and a second offset behavior for the second HARQ process that is different from the first behavior;

wherein:
the one or more slots corresponding to the first downlink slot offset parameter excludes any SB-FD slots between the first slot associated with the first HARQ process and the second slot associated with the first HARQ process, in accordance with the first offset behavior; and the one or more slots corresponding to the first HARQ timing parameter excludes any SB-FD between the second slot associated with the first HARQ process and the third slot associated with the first HARQ process, in accordance with the first offset behavior.

16. The wireless communication device of claim 15, wherein the second transmission comprises a grant of resources.

17. The wireless communication device of claim 15, wherein the second transmission comprises a physical downlink shared channel (PDSCH) transmission.

18. The wireless communication device of claim 15, wherein:
the one or more slots corresponding to the second downlink slot offset parameter excludes any TDD slots between the first slot associated with the second HARQ process and the second slot associated with the second HARQ process, in accordance with the second offset behavior; and the one or more slots corresponding to the second HARQ timing parameter excludes any TDD slots between the second slot associated with the second HARQ process and the third slot associated with the second HARQ process, in accordance with the second offset behavior.

19. The wireless communication device of claim 15, wherein:
the one or more slots corresponding to the second downlink slot offset parameter includes any TDD slots and any SB-FD slots between the first slot associated with the second HARQ process and the second slot associated with the second HARQ process; and the one or more slots corresponding to the second HARQ timing parameter includes any TDD and any SB-FD slots between the second slot associated with the second HARQ process and the third slot associated with the second HARQ process.

20. The wireless communication device of claim 12, wherein the one or more processors are further configured to cause the UE to:

select an offset behavior from one of the following offset behaviors based on contents of a message associated with at least the first HARQ process:

a first offset behavior for the first HARQ process, wherein:
the one or more slots corresponding to the first downlink slot offset parameter excludes any SB-FD slots between the first slot associated with the first HARQ process and the second slot associated with the first HARQ process; and the one or more slots corresponding to the first HARQ timing parameter excludes any SB-FD slots between the second slot associated with the first HARQ process and the third slot associated with the first HARQ process;

or a second offset behavior for the first HARQ process, wherein:
the one or more slots corresponding to the first downlink slot offset parameter includes any SB-FD slots between the first slot associated with the first HARQ process and the second slot associated with the first HARQ process; and the one or more slots corresponding to the first HARQ timing parameter includes any SB-FD slots between the second slot associated with the first HARQ process and the third slot associated with the first HARQ process.

21. The wireless communication device of claim 20, wherein the one or more processors are further configured to cause the UE:

receive, via the transceiver, in a first slot associated with a second HARQ process corresponding to the frame structure, a second downlink slot offset parameter and a second hybrid automatic repeat request (HARQ) timing parameter for the second HARQ process;

receive, via the transceiver, a second physical downlink shared channel in a second slot associated with the second HARQ process that is offset from the first slot associated with the second HARQ process by one or more slots corresponding the second downlink slot offset parameter;

transmit, via the transceiver, in a third slot associated with the second HARQ process that is offset from the second slot associated with the second HARQ process by one or more slots corresponding to the second HARQ timing parameter, a second acknowledgement corresponding to information received on the second physical downlink shared channel;

wherein the message indicates a first priority associated with the first HARQ process; and that the message also indicates a second priority associated with the second HARQ process that is different from the first priority; and wherein selecting the offset behavior further comprises:
selecting the first offset behavior for the first HARQ process based on the first priority; and selecting the second offset behavior for the second HARQ process based on the second priority;

wherein the one or more slots corresponding to the second downlink slot offset, includes any SB-FD slots between the first slot associated with the second HARQ process and the second slot associated with the second HARQ process, in accordance with the second offset behavior; and wherein the one or more slots corresponding to the second HARQ timing parameter includes any SB-FD slots between the second slot associated with second HARQ process and the third slot associated with the second HARQ process, in accordance with the second offset behavior.

22. The wireless communication device of claim 12, wherein:

the one or more slots corresponding to the first downlink slot offset parameter includes any TDD slots between the first slot associated with the first HARQ process and the second slot associated with the first HARQ process and any SB-FD slots between the first slot associated with the first HARQ process and the second slot associated with the first HARQ process; and the one or more slots corresponding to the first HARQ timing parameter includes any TDD slots between the second slot associated with the first HARQ process and the third slot associated with the first HARQ process and SB-FD slots between the second slot associated with the first HARQ process and the third slot associated with the first HARQ process.

23. A wireless communication device operable as user equipment (a UE), comprising:

means for receiving, in a first slot associated with a first hybrid automatic repeat request (HARQ) process, a first downlink slot offset parameter, the first HARQ process corresponding to a frame structure that includes one or more subband full duplex (SB-FD) slots and one or more time division duplex (TDD) slots;

means for receiving a first transmission in a second slot associated with the first HARQ process that is offset from the first slot associated with the first HARQ process by one or more slots corresponding to the first downlink slot offset parameter; and means for transmitting, in a third slot associated with the first HARQ process that is offset from the second slot associated with the first HARQ process by one or more slots corresponding to a first HARQ timing parameter, first HARQ-ACK information indicating whether the UE successfully decoded the first transmission.

24. The wireless communication device of claim 23, wherein the first transmission comprises a grant of resources.

25. The wireless communication device of claim 23, wherein the first transmission comprises a physical downlink shared channel (PDSCH) transmission.

26. The wireless communication device of claim 23, further comprising:

means for receiving the first HARQ timing parameter in the first slot associated with the first HARQ process;

means for receiving, in a first slot associated with a second HARQ process, a second downlink slot offset parameter and a second HARQ timing parameter for a second HARQ process corresponding to the frame structure;

means for receiving a second transmission in a second slot associated with the second HARQ process that is offset from the first slot associated with the second HARQ process by one or more slots corresponding to the second downlink slot offset parameter;

means for transmitting, in a third slot associated with the second HARQ process that is offset from the second slot associated with the second HARQ process by one or more slots corresponding to the second HARQ timing parameter, a second acknowledgement corresponding to information received on the second transmission; and means for receiving a partition indicator indicating a first offset behavior for the first HARQ process and a second offset behavior for the second HARQ process that is different from the first behavior;

wherein:

the one or more slots corresponding to the first downlink slot offset parameter excludes any SB-FD slots between the first slot associated with the first HARQ process and the second slot associated with the first HARQ process, in accordance with the first offset behavior; and the one or more slots corresponding to the first HARQ timing parameter excludes any SB-FD between the second slot associated with the first HARQ process and the third slot associated with the first HARQ process, in accordance with the first offset behavior.

27. The wireless communication device of claim 26, wherein the second transmission comprises a grant of resources.

28. The wireless communication device of claim 26, wherein the second transmission comprises a physical downlink shared channel (PDSCH) transmission.

29. The wireless communication device of claim 23, wherein:

the one or more slots corresponding to the first downlink slot offset parameter includes any TDD slots between the first slot associated with the first HARQ process and the second slot associated with the first HARQ process and any SB-FD slots between the first slot associated with the first HARQ process and the second slot associated with the first HARQ process; and the one or more slots corresponding to the first HARQ timing parameter includes any TDD slots between the second slot associated with the first HARQ process and the third slot associated with the first HARQ process and SB-FD slots between the second slot associated with the first HARQ process and the third slot associated with the first HARQ process.

30. A non-transitory computer-readable medium storing computer-executable code, operable by user equipment (a UE), comprising code for causing the UE to:

receive, via a transceiver, in a first slot associated with a first hybrid automatic repeat request (HARQ) process, a first downlink slot offset parameter, the first HARQ process corresponding to a frame structure that includes one or more subband full duplex (SB-FD) slots and one or more time division duplex (TDD) slots;

receive, via the transceiver, a first transmission in a second slot associated with the first HARQ process that is offset from the first slot associated with the first HARQ process by one or more slots corresponding to the first downlink slot offset parameter; and transmit, via the transceiver, in a third slot associated with the first HARQ process that is offset from the second slot associated with the first HARQ process by one or more slots corresponding to a first HARQ timing parameter, first HARQ-ACK information indicating whether the UE successfully decoded the first transmission.

* * * * *